United States Patent
Yoshikawa et al.

(10) Patent No.: US 11,153,625 B2
(45) Date of Patent: Oct. 19, 2021

(54) IMAGE DISPLAY METHOD, IMAGE DISTRIBUTION METHOD, IMAGE DISPLAY APPARATUS, AND IMAGE DISTRIBUTION APPARATUS

(71) Applicant: Panasonic Intellectual Property Corporation of America, Torrance, CA (US)

(72) Inventors: Satoshi Yoshikawa, Hyogo (JP); Toshiyasu Sugio, Osaka (JP); Toru Matsunobu, Osaka (JP); Tatsuya Koyama, Kyoto (JP); Masaki Fukuda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/801,717

(22) Filed: Feb. 26, 2020

(65) Prior Publication Data
US 2020/0195997 A1   Jun. 18, 2020

Related U.S. Application Data

(63) Continuation of application No. PCT/JP2018/033575, filed on Sep. 11, 2018.
(Continued)

(51) Int. Cl.
*H04N 5/232* (2006.01)
*H04N 21/2662* (2011.01)
(Continued)

(52) U.S. Cl.
CPC ..... *H04N 21/2662* (2013.01); *H04N 5/23232* (2013.01); *H04N 5/23245* (2013.01);
(Continued)

(58) Field of Classification Search
CPC .......... H04N 21/2662; H04N 5/23232; H04N 5/23245; H04N 5/2628; H04N 21/21805;
(Continued)

(56) References Cited

U.S. PATENT DOCUMENTS

| | | |
|---|---|---|
| 2001/0019360 A1 | 9/2001 | Tanaka et al. |
| 2003/0142872 A1 | 7/2003 | Koyanagi |

(Continued)

FOREIGN PATENT DOCUMENTS

| | | |
|---|---|---|
| JP | 9-271019 | 10/1997 |
| JP | 2002-165200 | 6/2002 |

(Continued)

OTHER PUBLICATIONS

International Search Report (ISR) dated Dec. 4, 2018 in International (PCT) Application No. PCT/JP2018/033575.

*Primary Examiner* — John R Schnurr
(74) *Attorney, Agent, or Firm* — Wenderoth, Lind & Ponack, L.L.P.

(57) ABSTRACT

An image display method includes receiving an integrated image in which low-resolution images of a scene from different viewpoints are arranged, displaying the integrated image such that a low-resolution image among the low-resolution images is displayed in a first size, receiving a high-resolution image having a same viewpoint as the low-resolution image, the high-resolution image having a higher resolution than the low-resolution image, displaying the high-resolution image in a second size larger than the first size, and displaying the low-resolution image in a third size larger than the first size after the integrated image is displayed and before the high-resolution image is displayed in the second size.

21 Claims, 18 Drawing Sheets

Related U.S. Application Data

(60) Provisional application No. 62/557,368, filed on Sep. 12, 2017.

(51) Int. Cl.
| | | |
|---|---|---|
| *H04N 5/262* | (2006.01) | |
| *H04N 21/218* | (2011.01) | |
| *H04N 21/2387* | (2011.01) | |
| *H04N 21/242* | (2011.01) | |
| *H04N 21/4728* | (2011.01) | |

(52) U.S. Cl.
CPC ..... *H04N 5/2628* (2013.01); *H04N 21/21805* (2013.01); *H04N 21/2387* (2013.01); *H04N 21/242* (2013.01); *H04N 21/4728* (2013.01)

(58) Field of Classification Search
CPC ............. H04N 21/2387; H04N 21/242; H04N 21/4728; H04N 5/247; H04N 5/783; H04N 7/18; H04N 21/6587
See application file for complete search history.

(56) References Cited

U.S. PATENT DOCUMENTS

| | | | |
|---|---|---|---|
| 2005/0071782 A1 | 3/2005 | Barrett et al. | |
| 2006/0171453 A1* | 8/2006 | Rohlfing | G08B 13/19656 375/240.01 |
| 2008/0129825 A1* | 6/2008 | DeAngelis | H04N 5/23299 348/169 |
| 2009/0322962 A1* | 12/2009 | Weeks | H04N 21/234363 348/726 |
| 2010/0050221 A1* | 2/2010 | McCutchen | H04N 21/234354 725/109 |
| 2015/0199366 A1* | 7/2015 | Marlatt | G06F 3/0608 707/823 |
| 2015/0201198 A1* | 7/2015 | Marlatt | H04N 19/162 375/240.03 |
| 2017/0201689 A1* | 7/2017 | Zilberman | H04N 1/3935 |
| 2017/0251274 A1 | 8/2017 | Fujii et al. | |

FOREIGN PATENT DOCUMENTS

| | | |
|---|---|---|
| JP | 2003-224846 | 8/2003 |
| JP | 2005-110286 | 4/2005 |
| JP | 2005-197948 | 7/2005 |
| JP | 2005-210434 | 8/2005 |
| JP | 2009-71733 | 4/2009 |
| JP | 2015-65508 | 4/2015 |
| JP | 2017-157903 | 9/2017 |

* cited by examiner

AMOUNT OF SLIDING: SPEED

VIEWPOINT IS UNSWITCHABLE    VIEWPOINT IS SWITCHABLE

IMAGE DISPLAY METHOD, IMAGE DISTRIBUTION METHOD, IMAGE DISPLAY APPARATUS, AND IMAGE DISTRIBUTION APPARATUS

CROSS REFERENCE TO RELATED APPLICATIONS

This application is a U.S. continuation application of PCT International Patent Application Number PCT/JP2018/033575 filed on Sep. 11, 2018, claiming the benefit of priority of U.S. Provisional Patent Application No. 62/557,368 filed on Sep. 12, 2017, the entire contents of which are hereby incorporated by reference.

BACKGROUND

1. Technical Field

The present disclosure relates to an image display method, an image distribution method, an image display apparatus, and an image distribution apparatus.

2. Description of the Related Art

As a multi-viewpoint video distribution method, Japanese Patent Laid-Open No. 2002-165200 describes a technique by which videos captured from multiple viewpoints are distributed in synchronization with viewpoint movements.

SUMMARY

According to one aspect of the present disclosure, an image display method includes receiving an integrated image in which low-resolution images of a scene from different viewpoints are arranged, displaying the integrated image such that a low-resolution image among the low-resolution images is displayed in a first size, receiving a high-resolution image having a same viewpoint as the low-resolution image, the high-resolution image having a higher resolution than the low-resolution image, displaying the high-resolution image in a second size larger than the first size, and displaying the low-resolution image in a third size larger than the first size after the integrated image is displayed and before the high-resolution image is displayed in the second size.

BRIEF DESCRIPTION OF DRAWINGS

These and other objects, advantages and features of the disclosure will become apparent from the following description taken in conjunction with the accompanying drawings that illustrate a specific embodiment of the present disclosure.

DETAILED DESCRIPTION OF THE EMBODIMENTS

Figure 1:
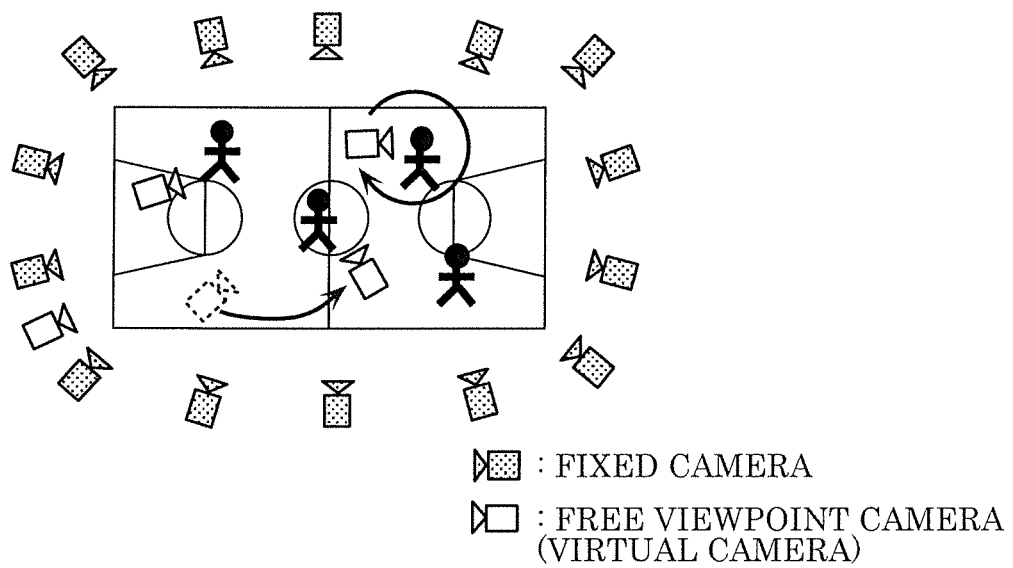
FIG. 1 is a diagram illustrating an outline of an image distribution system according to Embodiment 1.

An image distribution method according to an aspect of the present disclosure is an image distribution method in an image distribution system in which a plurality of images of a scene seen from different viewpoints are distributed to a plurality of users, each of whom is capable of viewing any of the plurality of images. The image distribution method includes: generating an integrated image in which the plurality of images are arranged in a frame; and distributing the integrated image to a plurality of image display apparatuses used by the plurality of users.

In this manner, images from multiple viewpoints can be transmitted as a single integrated image, so that the same integrated image can be transmitted to the multiple image display apparatuses. This can simplify the system configuration. Using the single-image format can reduce changes to be made on an existing configuration and can also reduce the data amount of the distributed video with techniques such as an existing image compression technique.

For example, at least one of the plurality of images included in the integrated image may be a virtual image generated from a real image.

For example, the plurality of images included in the integrated image may have a same resolution.

This facilitates the management of the images. In addition, because the multiple images can be processed in the same manner, the amount of processing can be reduced.

For example, the plurality of images included in the integrated image may include images of different resolutions.

In this manner, the quality of images, for example higher-priority images, can be improved.

For example, the plurality of images included in the integrated image may be images at a same time point.

For example, in the generating, a plurality of integrated images including the integrated image are generated, and the plurality of images included in two or more of the integrated images may be images at a same time point.

In this manner, the number of viewpoints of the images to be distributed can be increased.

For example, the plurality of images included in the integrated image may include images from a same viewpoint at different time points.

This allows the image display apparatuses to display the images correctly even if some of the images are missing due to a communication error.

For example, in the distributing, arrangement information indicating an arrangement of the plurality of images in the integrated image may be distributed to the plurality of image display apparatuses.

For example, in the distributing, information indicating a viewpoint of each of the plurality of images in the integrated image may be distributed to the plurality of image display apparatuses.

For example, in the distributing, time information about each of the plurality of images in the integrated image may be distributed to the plurality of image display apparatuses.

For example, in the distributing, information indicating a switching order of the plurality of images in the integrated image may be distributed to the plurality of image display apparatuses.

An image display method according to an aspect of the present disclosure is an image display method in an image distribution system in which a plurality of images of a scene seen from different viewpoints are distributed to a plurality of users, each of whom is capable of viewing any of the plurality of images. The image display method includes: receiving an integrated image in which the plurality of images are arranged in a frame; and displaying one of the plurality of images included in the integrated image.

In this manner, an image of any viewpoint can be displayed by using the images from multiple viewpoints transmitted as a single integrated image. This can simplify the system configuration. Using the single-image format can reduce changes to be made on an existing configuration and can also reduce the data amount of the distributed video with techniques such as an existing image compression technique.

An image distribution apparatus according to an aspect of the present disclosure is an image distribution apparatus included in an image distribution system in which a plurality of images of a scene seen from different viewpoints are distributed to a plurality of users, each of whom is capable of viewing any of the plurality of images. The image distribution apparatus includes: a generator that generates an integrated image in which the plurality of images are arranged in a frame; and a distributor distributes the integrated image to a plurality of image display apparatuses used by the plurality of users.

In this manner, images from multiple viewpoints can be transmitted as a single integrated image, so that the same integrated image can be transmitted to the multiple image display apparatuses. This can simplify the system configuration. Using the single-image format can reduce changes to be made on an existing configuration and can also reduce the data amount of the distributed video with techniques such as an existing image compression technique.

An image display apparatus according to an aspect of the present disclosure is an image display apparatus included in an image distribution system in which a plurality of images of a scene seen from different viewpoints are distributed to a plurality of users, each of whom is capable of viewing any of the plurality of images. The image display method includes: a receiver that receives an integrated image in which the plurality of images are arranged in a frame; and a display that displays one of the plurality of images included in the integrated image.

In this manner, an image of any viewpoint can be displayed by using the images from multiple viewpoints transmitted as a single integrated image. This can simplify the system configuration. Using the single-image format can reduce changes to be made on an existing configuration and can also reduce the data amount of the distributed video with techniques such as an existing image compression technique.

An image display method according to an aspect of the present disclosure includes: displaying at least one of videos of a scene viewed from different viewpoints, as a displayed video, the videos including at least one virtual video generated from a real video; displaying a first user interface for selecting a viewpoint of the displayed video, and changing the viewpoint of the displayed video according to an input provided via the first user interface; and displaying a second user interface for changing a playing speed of the displayed video, and changing the playing speed of the displayed video according to an input provided via the second user interface.

Accordingly, the user can easily change the viewpoint being viewed and the playing speed by using the first user interface and the second user interface. Therefore, the image display method can improve usability for the user viewing the video.

For example, the second user interface may be for changing the playing speed and a playing direction of the displayed video, and in the changing of the playing speed, the playing speed and the playing direction of the displayed video may be changed according to an input provided via the second user interface.

Accordingly, the user can easily change the playing speed and playing direction by using the second user interface. Therefore, the image display method can improve usability for the user viewing the video.

For example, in the second user interface, the playing speed may be changed by moving an object in a first direction, and the playing direction may be changed by moving the object in a second direction orthogonal to the first direction.

Accordingly, the user can operate the playing speed and playing direction intuitively.

For example, the second user interface may comprise a dial, and the playing speed may be changed according to an amount of rotation of the dial and the playing direction may be changed according to a rotation direction of the dial.

Accordingly, the user can operate the playing speed and the playing direction intuitively.

For example, the second user interface may comprise a slide bar, and the playing speed may be changed according to an amount of sliding on the slide bar and the playing direction may be changed according to a sliding direction on the slide bar.

Accordingly, the user can operate the playing speed and the playing direction intuitively.

For example, when an operation on the second user interface is finished, the playing speed and the playing direction at the time of finishing the operation may be maintained.

Accordingly, the usability for the user can be improved.

For example, when an operation on the second user interface is finished, the displayed video may be displayed at a predetermined playing speed and in a predetermined playing direction.

Accordingly, the usability for the user can be improved.

For example, when an operation on the second user interface is finished, one of the playing speed and the playing direction may remain in a state at the time of finishing the operation, and the other of the playing speed and the playing direction may return to a predetermined state.

Accordingly, the usability for the user can be improved.

For example, at least one of the first user interface or the second user interface may be transparently displayed when not operated.

Accordingly, it is possible to prevent the first user interface or the second user interface from interfering with video viewing, when not being operated.

For example, in response to a selection operation at a predetermined position on a screen, at least one of the first user interface or the second user interface may be displayed at the predetermined position.

Accordingly, the usability for the user can be improved.

For example, in response to a selection operation at any position on a screen, at least one of the first user interface or the second user interface may be displayed at the selected position.

Accordingly, the usability for the user can be improved.

For example, in the displaying of the at least one of the videos, a plurality of displayed videos may be displayed, at least one of the first user interface or the second user interface may be displayed for each of the displayed videos, and in response to an operation on the at least one of the first user interface or the second user interface corresponding to one of the videos, at least one of the viewpoint or the playing speed of the one of the videos may be changed.

Accordingly, the user can control the viewpoint or the playing speed for each displayed video, and thus usability for the user can be improved.

For example, in the displaying of the at least one of the videos, a plurality of displayed videos may be displayed, and in response to an operation on at least one of the first user interface or the second user interface, at least one of the viewpoint or the playing speed of the displayed videos may be changed.

Accordingly, the user can collectively operate the displayed videos, and thus usability for the user is improved.

For example, the first user interface may comprise: a path of selectable viewpoint positions; and an object disposed on the path to indicate a viewpoint position, and moving the object to any position on the path may cause the viewpoint of the displayed video to be changed to a viewpoint corresponding to the position on the path after moving.

Accordingly, the user can operate the viewpoint of the displayed video intuitively.

For example, the first user interface may comprise: a first operation section for selecting any of gaze points; and a second operation section for selecting any of viewpoints that focus on a gaze point selected from the gaze points.

Accordingly, the user can operate the viewpoint of the displayed video intuitively.

For example, in the first user interface, objects corresponding to viewpoint positions may be disposed on environmental information that two-dimensionally or three-dimensionally represents a surrounding environment, and selecting any of the objects may cause the displayed video to be changed to a video viewed from a viewpoint position corresponding to the selected object.

Accordingly, the user can operate the viewpoint of the displayed video intuitively.

An image display apparatus according to an aspect of the present disclosure includes: a display configured to display at least one of videos of a scene viewed from different viewpoints, as a displayed video, the videos including at least one virtual video generated from a real video; a viewpoint changer configured to display a first user interface for selecting a viewpoint of the displayed video, and change the viewpoint of the displayed video according to an input provided via the first user interface; and a playing speed changer configured to display a second user interface for changing a playing speed of the displayed video, and change the playing speed of the displayed video according to an input provided via the second user interface.

Accordingly, the user can easily change the viewpoint being viewed and the playing speed by using the first user interface and the second user interface. Therefore, the image display apparatus can improve usability for the user viewing the video.

An image display method according to an aspect of the present disclosure includes: receiving an integrated image in which low-resolution images of a scene from different viewpoints are arranged in a frame; displaying at least one of the low-resolution images included in the integrated image received; receiving a high-resolution image which is an image from the same viewpoint as and having a higher resolution than a selected low-resolution image selected among the low-resolution images; and displaying the high-resolution image received.

Accordingly, an increase in the amount of data to be distributed can be prevented using the integrated image in which low-resolution images are arranged in a frame. Since it is possible to display images by switching between the low-resolution image and the high-resolution image, a video of high image quality can be provided to the user. The image display method can thus improve usability for the user viewing the video while preventing an increase in the amount of data to be distributed.

For example, in the displaying of the at least one of the low-resolution images, the integrated image may be displayed, and in the displaying of the high-resolution image, the high-resolution image may be displayed in a second size larger than a first size of the selected low-resolution image as displayed in the integrated image.

For example, the image display method may include: displaying the selected low-resolution image in a third size larger than the first size after the integrated image is displayed; and displaying the high-resolution image in the second size after the selected low-resolution image is displayed in the third size.

For example, the image display method may include: transitioning from normal mode in which the low-resolution images are received and displayed to high-resolution mode in which the high-resolution image is received and displayed, when a predetermined operation by a user is received.

For example, the selected low-resolution image may be a video, and the predetermined operation may be an operation for pausing the selected low-resolution image.

Accordingly, it is possible to provide an image of high image quality to the user while preventing an increase in the amount of data to be distributed.

For example, the selected low-resolution image may be a video, the predetermined operation may be a frame-by-frame advance operation or a slow-motion replay operation for the selected low-resolution image, and in the high-resolution mode, the high-resolution image having a frame rate higher than a frame rate of the selected low-resolution image may be received, and displayed frame by frame or played at a slow speed.

Accordingly, it is possible to provide an image or video of high image quality to the user in the high-resolution mode.

For example, more viewpoints may be selectable in the high-resolution mode than in the normal mode.

Accordingly, it is possible to have more viewpoints selectable by the user in high-resolution mode.

For example, the high-resolution image may be a high-resolution image of a partial area in the selected low-resolution image.

Accordingly, by displaying only a partial area in high resolution, it is possible to prevent an increase in the amount of data.

For example, the partial area may be an area containing a face or characters.

An image distribution method according to an aspect of the present disclosure includes: generating an integrated image in which low-resolution images of a scene from different viewpoints are arranged in a frame; distributing, to an image display apparatus, the integrated image generated; generating, in response to a request from the image display apparatus, a high-resolution image which is an image from the same viewpoint as and having a higher resolution than a selected low-resolution image selected among the low-resolution images included in the integrated image; and distributing, to the image display apparatus, the high-resolution image generated.

Accordingly, an increase in the amount of data to be distributed can be prevented Using the integrated image in which low-resolution images are arranged in a frame. Since it is possible to display images by switching between the low-resolution image and the high-resolution image, a video of high image quality can be provided to the user. The image distribution method can thus improve usability for the user viewing the video while preventing an increase in the amount of data to be distributed.

For example, the image distribution method may include: transitioning from normal mode in which the low-resolution images are distributed to high-resolution mode in which the high-resolution image is distributed, when the image display apparatus receives a predetermined operation by a user.

For example, the selected low-resolution image may be a video, and the predetermined operation may be an operation for pausing the selected low-resolution image.

Accordingly, it is possible to provide an image of high image quality to the user while preventing an increase in the amount of data to be distributed.

For example, the selected low-resolution image may be a video, the predetermined operation may be a frame-by-frame advance operation or a slow-motion replay operation for the selected low-resolution image, and in the high-resolution mode, the high-resolution image having a frame rate higher than a frame rate of the selected low-resolution image may be distributed to the image display apparatus.

Accordingly, it is possible to provide an image or video of high image quality to the user in the high-resolution mode.

For example, more viewpoints may be selectable by the user in the high-resolution mode than in the normal mode.

Accordingly, it is possible to have more viewpoints selectable by the user in high-resolution mode.

For example, the high-resolution image may be a high-resolution image of a partial area in the selected low-resolution image.

Accordingly, by displaying only a partial area in high resolution, it is possible to prevent an increase in the amount of data.

For example, the partial area may be an area containing a face or characters.

For example, the image distribution method may include: when distributing the high-resolution image corresponding to the selected low-resolution image to the image display apparatus, generating an image which is from a viewpoint close to the viewpoint of the selected low-resolution image among the viewpoints of the low-resolution images and has a higher resolution than the low-resolution images.

Accordingly, it is possible to reduce the time before video is displayed after the viewpoint is switched.

An image display apparatus according to an aspect of the present disclosure includes: circuitry; and memory, wherein the circuitry, using the memory, performs the above-described image display method.

Accordingly, an increase in the amount of data to be distributed can be prevented using the integrated image in which low-resolution images are arranged in a frame. Since it is possible to display images by switching between the low-resolution image and the high-resolution image, a video of high image quality can be provided to the user. The image display apparatus can thus improve usability for the user viewing the video while preventing an increase in the amount of data to be distributed.

An image distribution apparatus according to an aspect of the present disclosure includes: circuitry; and memory, wherein the circuitry, using the memory, performs the above-described image distribution method.

Accordingly, an increase in the amount of data to be distributed can be prevented using the integrated image in which low-resolution images are arranged in a frame. Since the image display apparatus can display images by switching between the low-resolution image and the high-resolution image, a video of high image quality can be provided to the user. The image distribution method can thus improve usability for the user viewing the video while preventing an increase in the amount of data to be distributed.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, exemplary embodiments will be described in detail with reference to the drawings. Note that each of the following exemplary embodiments shows a specific example the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

This embodiment describes an image distribution system in which videos, including multi-viewpoint videos captured by multi-viewpoint cameras and/or free-viewpoint videos generated using the multi-viewpoint videos, are simultaneously provided to multiple users, who can each change the video to view.

With multiple videos such as camera-captured videos and/or free-viewpoint videos, videos seen from various directions can be acquired or generated. This enables providing videos that meet various needs of viewers. For example, an athlete's close-up or long shot can be provided according to various needs of viewers.

FIG. 1 is a diagram illustrating the overview of an image distribution system. For example, a space can be captured using calibrated cameras (e.g., fixed cameras) from multiple viewpoints to three-dimensionally reconstruct the captured space (three-dimensional space reconstruction). This three-dimensionally reconstructed data can be used to perform tracking, scene analysis, and video rendering, thereby generating free-viewpoint videos seen from arbitrary viewpoints (free-viewpoint cameras). This can realize next-generation wide-area monitoring systems and free-viewpoint video generation systems.

However, while the system as above can provide various videos, meeting each viewer's needs requires providing a different video to each viewer. For example, if users watching a sports game in a stadium view videos, there may be thousands of viewers. It is then difficult to have a sufficient communication band for distributing a different video to each of the many viewers. In addition, the distributed video needs to be changed each time the viewer switches the viewpoint during viewing, and it is difficult to perform this process for each viewer. It is therefore difficult to realize a system that allows viewers to switch the viewpoint at any point of time.

In light of the above, in the image distribution system according to this embodiment, two or more viewpoint videos (including camera-captured videos and/or free-viewpoint videos) are arranged in a single video (an integrated video), and the single video and arrangement information are transmitted to viewers (users). Image display apparatuses (receiving apparatuses) each have the function of displaying one or more viewpoint videos from the single video, and the function of switching the displayed video on the basis of the viewer's operation. A system can thus be realized in which many viewers can view videos from different viewpoints and can switch the viewed video at any point of time.

First, exemplary configurations of the integrated video according to this embodiment will be described. FIGS. 2A, 2B, 2C, and 2D are diagrams illustrating exemplary integrated images according to this embodiment. An integrated image is an image (a frame) included in the integrated video.

As shown in FIGS. 2A to 2D, each of integrated images 151A to 151D includes multiple images 152. That is, multiple low-resolution (e.g., 320×180 resolution) images 152 are arranged in each of higher resolution (e.g., 3840×2160 resolution) integrated images 151A to 151D.

Images 152 here are, for example, images at the same time point included in multiple videos from different viewpoints. For example, in the example shown in FIG. 2A, nine images 152 are images at the same time point included in videos from nine different viewpoints. Note that images 152 may include images at different time points.

Figure 2A:
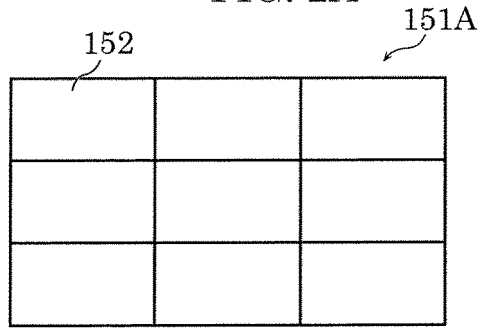
FIG. 2A is a diagram illustrating an example of an integrated image according to Embodiment 1.
Figure 2B:
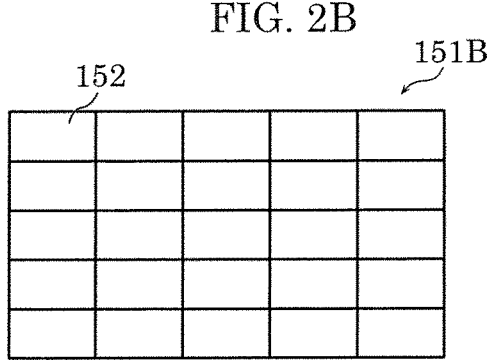
FIG. 2B is a diagram illustrating an example of an integrated image according to Embodiment 1.
Figure 2C:
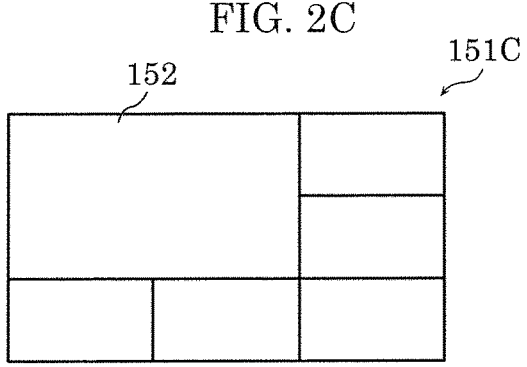
FIG. 2C is a diagram illustrating an example of an integrated image according to Embodiment 1.
Figure 2D:
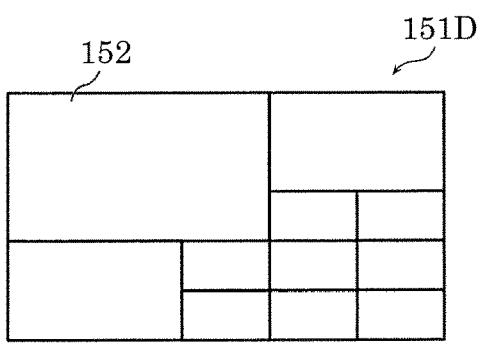
FIG. 2D is a diagram illustrating an example of an integrated image according to Embodiment 1.

Images 152 may be of the same resolution as shown in FIGS. 2A and 2B, or may include images of different resolutions in different patterns as shown in FIGS. 2C and 2D.

For example, the arrangement pattern and the resolutions may be determined according to the ratings or the distributor's intension. As an example, image 152 included in a higher-priority video is set to have a larger size (higher resolution). A higher-priority video here refers to, for example, a video with higher ratings or a video with a higher evaluation value (e.g., a video of a person's close-ups). In this manner, the image quality of videos in great demand or intended to draw the viewers' attention can be improved.

Images 152 included in such higher-priority videos may be placed in upper-left areas. The encoding process for streaming distribution or for broadcasting involves processing for controlling the amount of code. This processing allows the image quality to be more stable in areas closer to the upper-left area, which are the areas scanned earliest. The quality of the higher-priority images placed in the upper-left areas can thus be stabilized.

Images 152 may be images of the same gaze point seen from different viewpoints. For example, for a video of a match in a boxing ring, the gaze point may be the center of the ring, and the viewpoints for images 152 may be arranged on circumferences about the gaze point.

Images 152 may include images of different gaze points seen from one or more viewpoints. That is, images 152 may include one or more images of a first gaze point seen from one or more viewpoints, and one or more images of a second gaze point seen from one or more viewpoints. In an example of a soccer game, the gaze points may be players, and images 152 may include images of each player seen from the front, back, right, and left. For a concert of an idol group, images 152 may include multi-angle images of the idols, such as each idol's full-length shot and bust shot.

Images 152 may include a 360-degree image for use in technologies such as VR (Virtual Reality). Images 152 may include an image that reproduces an athlete's sight. Such images may be generated using images 152.

Images 152 may be images included in camera-captured videos actually captured by a camera, or may include one or more free-viewpoint images from viewpoints inaccessible to a camera, generated through image processing. All images 152 may be free-viewpoint images.

The integrated video may be generated to include integrated images at all time points. Alternatively, integrated images only for some of the time points in the videos may be generated.

The processing herein may also be performed for still images rather than videos.

Now, the arrangement information, which is transmitted along with the integrated image, will be described. The arrangement information is information that defines information about each viewpoint image (image 152) in the integrated image and viewpoint switching rules.

The information about each viewpoint image includes viewpoint information indicating the viewpoint position, or time information about the image. The viewpoint information is information indicating the three-dimensional coordinates of the viewpoint, or information indicating a predetermined ID (identification) of the viewpoint position on a map.

The time information about the viewpoint image may be information indicating the absolute time, such as the ordinal position of the frame in the series of frames, or may be information indicating a relative relationship with another integrated-image frame.

The information about the viewpoint switching rules includes information indicating the viewpoint switching order, or grouping information. The information indicating the viewpoint switching order is, for example, table information that defines the relationships among the viewpoints. For example, each image display apparatus 103 can use this table information to determine the viewpoints adjacent to a certain viewpoint. This allows image display apparatus 103 to determine which viewpoint image to use for moving from one viewpoint to an adjacent viewpoint. Image display apparatus 103 can also use this information to readily recognize the viewpoint switching order in sequentially changing the viewpoint. This allows image display apparatus 103 to provide animation with the smoothly switched viewpoint.

A flag may be provided for each viewpoint, indicating that the viewpoint (or the video from the viewpoint) can be used in inter-viewpoint transition for sequential viewpoint movements but the video alone cannot be displayed.

Figure 3:
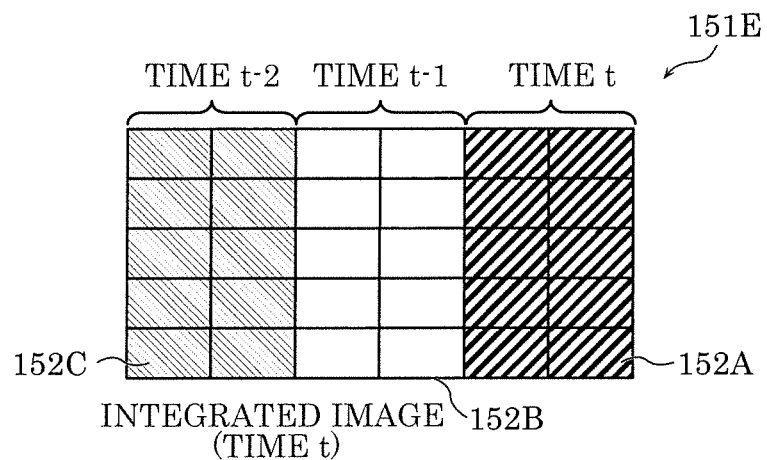
FIG. 3 is a diagram illustrating an example of an integrated image according to Embodiment 1.

Images 152 included in the integrated image do not all need to be images at the same time point. FIG. 3 is a diagram illustrating an exemplary configuration of integrated image 151E that includes images at different time points. For example, as shown in FIG. 3, integrated image 151E at time t includes images 152A at time t, images 152B at time t−1, and images 152C at time t−2. In the example shown in FIG. 3, images of videos from 10 viewpoints at each of the three time points are included in integrated image 151E.

In this manner, frame loss of the viewpoint videos (images 152A to 152C) could be avoided even if any frame of the integrated video is missing. Specifically, even if integrated image 151E at time t is missing, the image display apparatus can play the video using images at time t included in integrated image 151E at another time point.

Figure 4:
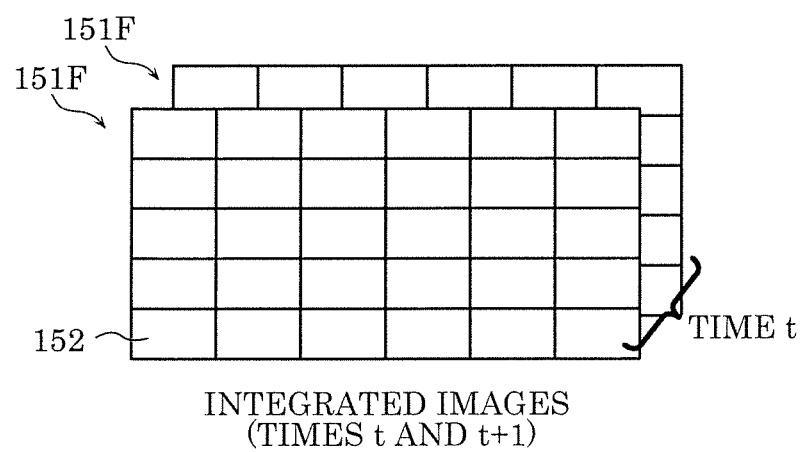
FIG. 4 is a diagram illustrating an example of integrated images according to Embodiment 1.

FIG. 4 is a diagram illustrating an exemplary configuration of integrated images 151F in the case where integrated images at multiple time points include images at the same time point. As shown in FIG. 4, images 152 at time t are included across integrated image 151F at time t and integrated image 151F at time t+1. That is, in the example shown in FIG. 4, each integrated image 151F includes images 152 from 30 viewpoints at time t. The two integrated images 151F therefore include images 152 from 60 viewpoints in total, at time t. In this manner, an increased number of viewpoint videos can be provided for a certain time point.

The manner of temporally dividing or integrating the frames as above may not be uniform but may be varied in the video. For example, for important scenes such as shoot scenes in a soccer game, the manner shown in FIG. 4 may be used to increase the number of viewpoints; for other scenes, the integrated image at a given time point may include images 152 only at that time point.

Figure 5:
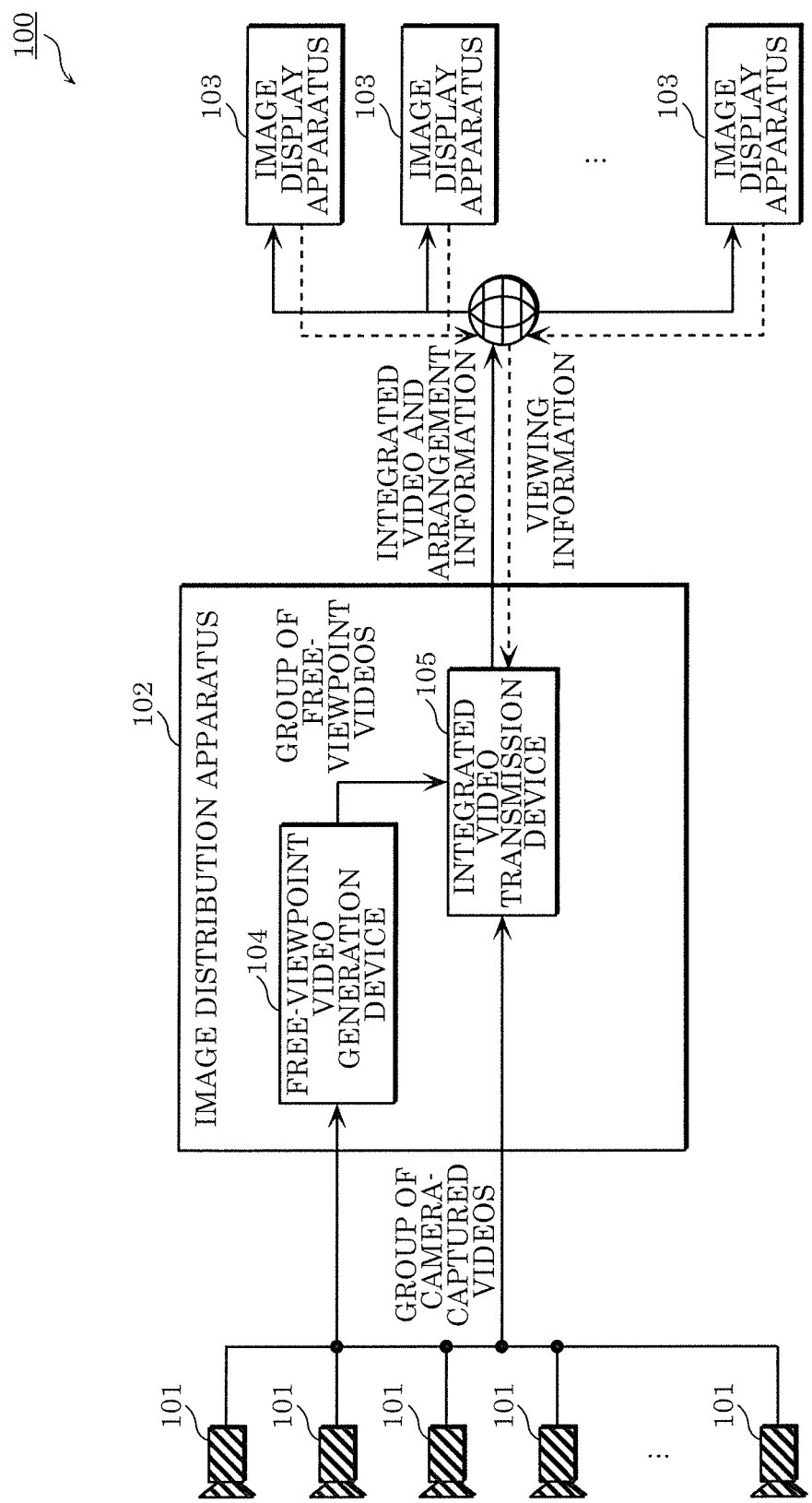
FIG. 5 is a diagram illustrating a configuration of the image distribution system according to Embodiment 1.

Now, the configuration of image distribution system 100 according to this embodiment will be described. FIG. 5 is a block diagram of image distribution system 100 according to this embodiment. Image distribution system 100 includes cameras 101, image distribution apparatus 102, and image display apparatuses 103.

Cameras 101 generate a group of camera-captured videos, which are multi-viewpoint videos. The videos may be synchronously captured by all cameras. Alternatively, time information may be embedded in the videos, or index information indicating the frame order may be attached to the videos, so that image distribution apparatus 102 can identify images (frames) at the same time point. Note that one or more camera-captured videos may be generated by one or more cameras 101.

Image distribution apparatus 102 includes free-viewpoint video generation device 104 and integrated video transmission device 105. Free-viewpoint video generation device 104 uses one or more camera-captured videos from cameras 101 to generate one or more free-viewpoint videos seen from virtual viewpoints. Free-viewpoint video generation device 104 sends the generated one or more free-viewpoint videos (a group of free-viewpoint videos) to integrated video transmission device 105.

For example, free-viewpoint video generation device 104 may use the camera-captured videos and positional information about the videos to reconstruct a three-dimensional space, thereby generating a three-dimensional model. Free-viewpoint video generation device 104 may then use the generated three-dimensional model to generate a free-viewpoint video. Free-viewpoint video generation device 104 may also generate a free-viewpoint video by using images captured by two or more cameras to interpolate camera-captured videos.

Integrated video transmission device 105 uses one or more camera-captured videos and/or one or more free-viewpoint videos to generate an integrated video in which each frame includes multiple images. Integrated video transmission device 105 transmits, to image display apparatuses 103, the generated integrated video and arrangement information indicating information such as the positional relationships among the videos in the integrated video.

Each of image display apparatuses 103 receives the integrated video and the arrangement information transmitted by image distribution apparatus 102 and displays, to a user, at least one of the viewpoint videos included in the integrated video. Image display apparatus 103 switches the displayed viewpoint video in response to a UI operation. This realizes an interactive video switching based on the user's operations. Image display apparatus 103 feeds back viewing information, indicating the currently used viewpoint or currently viewed viewpoint video, to image distribution apparatus 102. Note that image distribution system 100 may include one or more image display apparatuses 103.

Figure 6:
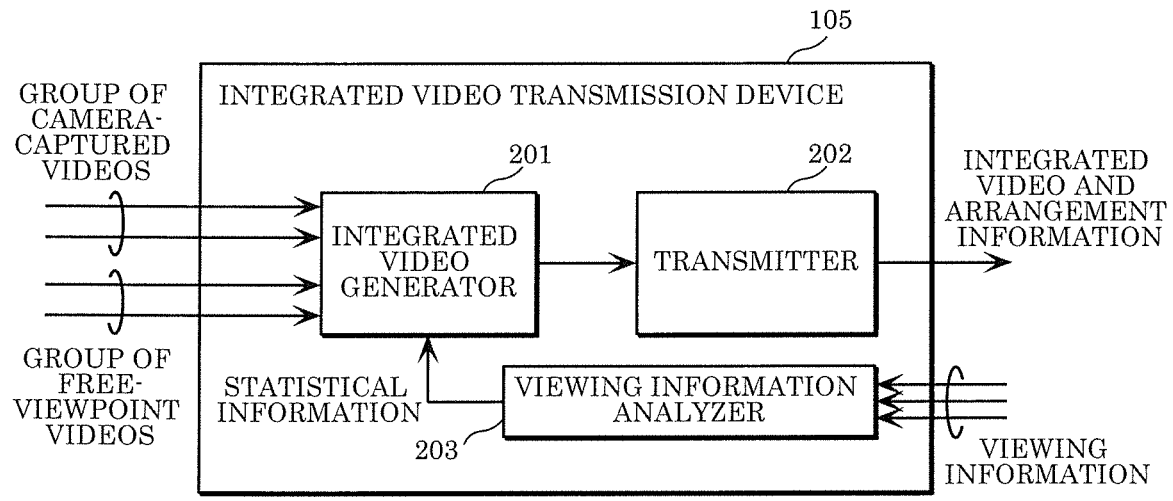
FIG. 6 is a block diagram of an integrated video transmission device according to Embodiment 1.

Now, the configuration of integrated video transmission device 105 will be described. FIG. 6 is a block diagram of integrated video transmission device 105. Integrated video transmission device 105 includes integrated video generator 201, transmitter 202, and viewing information analyzer 203.

Integrated video generator 201 generates an integrated video from two or more videos (camera-captured videos and/or free-viewpoint videos) and generates arrangement information about each video in the integrated video.

Transmitter 202 transmits the integrated video and the arrangement information generated by integrated video generator 201 to one or more image display apparatuses 103. Transmitter 202 may transmit the integrated video and the arrangement information to image display apparatuses 103 either as one stream or through separate paths. For example, transmitter 202 may transmit, to image display apparatuses 103, the integrated video through a broadcast wave and the arrangement information through network communication.

Viewing information analyzer 203 aggregates viewing information (e.g., information indicating the viewpoint video currently displayed on each image display apparatus 103) transmitted from one or more image display apparatuses 103. Viewing information analyzer 203 passes the resulting statistical information (e.g., the ratings) to integrated video generator 201. Integrated video generator 201 uses this statistical information as referential information in integrated-video generation.

Transmitter 202 may stream the integrated video and the arrangement information or may transmit them as a unit of sequential video frames.

As a rendering effect preceding the initial view of the distributed video, image distribution apparatus 102 may generate a video in which the view is sequentially switched from a long-shot view to the initial view, and may distribute the generated video. This can provide, e.g., as a lead-in to a replay, a scene allowing the viewers to grasp spatial information, such as the position or posture with respect to the initial viewpoint. This processing may be performed in image display apparatuses 103 instead. Alternatively, image distribution apparatus 102 may send information indicating the switching order and switching timings of viewpoint videos to image display apparatuses 103, which may then switch the displayed viewpoint video according to the received information to create the above-described video.

Figure 7:
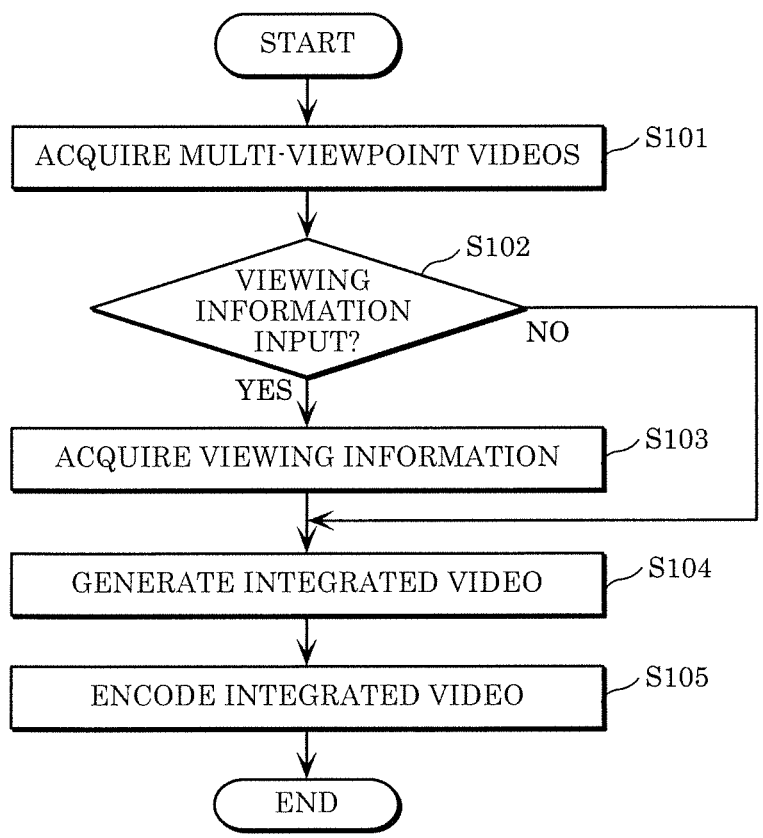
FIG. 7 is a flowchart of an integrated video generating process according to Embodiment 1.

Now, the flow of operations in integrated video generator 201 will be described. FIG. 7 is a flowchart of the process of generating the integrated video by integrated video generator 201.

First, integrated video generator 201 acquires multi-viewpoint videos (S101). The multi-viewpoint videos include two or more videos in total, including camera-captured videos and/or free-viewpoint videos generated through image processing, such as a free-viewpoint video generation processing or morphing processing. The camera-captured videos do not need to be directly transmitted from cameras 101 to integrated video generator 201. Rather, the videos may be saved in some other storage before being input to integrated video generator 201; in this case, a system utilizing archived past videos, instead of real-time videos, can be constructed.

Integrated video generator 201 determines whether there is viewing information from image display apparatuses 103 (S102). If there is viewing information (Yes at S102), integrated video generator 201 acquires the viewing information (e.g., the ratings of each viewpoint video) (S103). If viewing information is not to be used, the process at steps S102 and S103 is skipped.

Integrated video generator 201 generates an integrated video from the input multi-viewpoint videos (S104). First, integrated video generator 201 determines how to divide the frame area for arranging the viewpoint videos in the integrated video. Here, integrated video generator 201 may arrange all videos in the same resolution as shown in FIGS. 2A and 2B, or the videos may vary in resolution as shown in FIGS. 2C and 2D.

If the videos are set to have the same resolution, the processing load can be reduced because the videos from all viewpoints can be processed in the same manner in subsequent stages. By contrast, if the videos vary in resolution, the image quality of higher-priority videos (such as a video from a viewpoint recommended by the distributor) can be improved to provide a service tailored to the viewers.

As shown in FIG. 3, an integrated image at a certain time point may include multi-viewpoint images at multiple time points. As shown in FIG. 4, integrated images at multiple time points may include multi-viewpoint images at the same time point. The former way can ensure redundancy in the temporal direction, thereby providing stable video viewing experiences even under unstable communication conditions. The latter way can provide an increased number of viewpoints.

Integrated video generator 201 may vary the dividing scheme according to the viewing information acquired at step S103. Specifically, a viewpoint video with higher ratings may be placed in a higher resolution area so that the video is rendered with a definition higher than the definition of the other videos.

Integrated video generator 201 generates arrangement information. The arrangement information includes the determined dividing scheme and information associating the divided areas with viewpoint information about the respective input videos (i.e., information indicating which viewpoint video is placed in which area). Here, integrated video generator 201 may further generate transition information indicating transitions between the viewpoints, and grouping information presenting a video group for each player.

On the basis of the generated arrangement information, integrated video generator 201 generates the integrated video from the two or more input videos.

Finally, integrated video generator 201 encodes the integrated video (S105). This process is not required if the communication band is sufficient. Integrated video generator 201 may set each video as an encoding unit. For example, integrated video transmission device 105 may set each video as a slice or tile in H.265/HEVC. The integrated video may then be encoded in a manner that allows each video to be independently decoded. This allows only one viewpoint video to be decoded in a decoding process, so that the amount of processing in image display apparatuses 103 can be reduced.

Integrated video generator 201 may vary the amount of code assigned to each video according to the viewing information. Specifically, for an area in which a video with high ratings is placed, integrated video generator 201 may improve the image quality by reducing the value of a quantization parameter.

Integrated video generator 201 may make the image quality (e.g., the resolution or the quantization parameter) uniform for a certain group (e.g., viewpoints focusing on the same player as the gaze point, or concyclic viewpoints). In this manner, the degree of change in image quality at the time of viewpoint switching can be reduced.

Integrated video generator 201 may process the border areas and the other areas differently. For example, a deblocking filter may not be used for the borders between the viewpoint videos.

Figure 8:
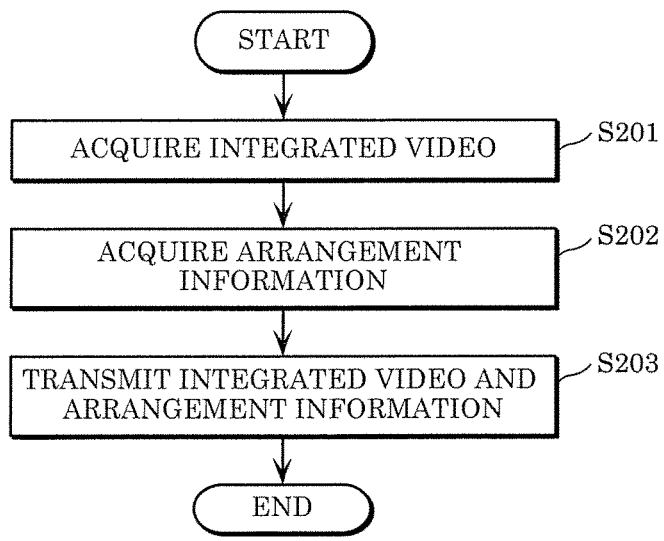
FIG. 8 is a flowchart of a transmission process according to Embodiment 1.

Now, a process in transmitter 202 will be described. FIG. 8 is a flowchart of a process performed by transmitter 202.

First, transmitter 202 acquires the integrated video generated by integrated video generator 201 (S201). Transmitter 202 then acquires the arrangement information generated by integrated video generator 201 (S202). If there are no changes in the arrangement information, transmitter 202 may reuse the arrangement information used for the previous frame instead of acquiring new arrangement information.

Finally, transmitter 202 transmits the integrated video and the arrangement information acquired at steps S201 and S202 (S203). Transmitter 202 may broadcast these information items, or may transmit these information items using one-to-one communication. Transmitter 202 does not need to transmit the arrangement information for each frame but may transmit the arrangement information when the video arrangement is changed. Transmitter 202 may also transmit the arrangement information at regular intervals (e.g., every second). The former way can minimize the amount of information to be transmitted. The latter way allows image display apparatuses 103 to regularly acquire correct arrangement information; image display apparatuses 103 can then address a failure in information acquisition due to communication conditions or can address acquisition of an in-progress video.

Transmitter 202 may transmit the integrated video and the arrangement information as interleaved or as separate pieces of information. Transmitter 202 may transmit the integrated video and the arrangement information through a communication path such as the Internet, or through a broadcast wave. Transmitter 202 may also combine these transmission schemes. For example, transmitter 202 may transmit the integrated video through a broadcast wave and transmit the arrangement information through a communication path.

Figure 9:
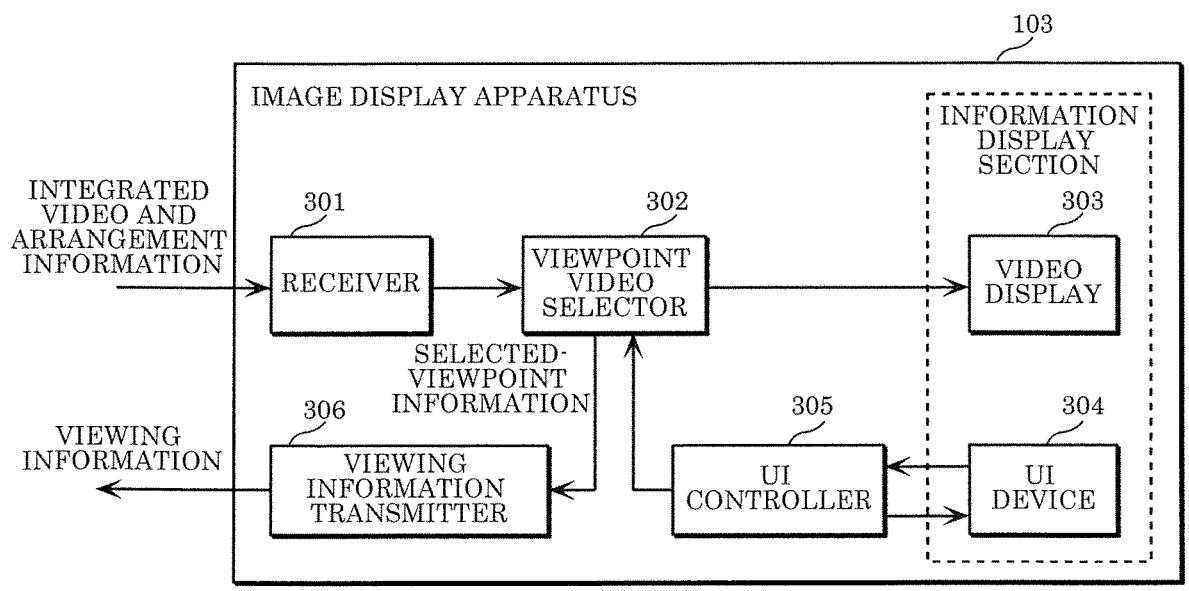
FIG. 9 is a block diagram of an image display apparatus according to Embodiment 1.

Now, the configuration of each image display apparatus 103 will be described. FIG. 9 is a block diagram of image display apparatus 103. Image display apparatus 103 includes receiver 301, viewpoint video selector 302, video display 303, UI device 304, UI controller 305, and viewing information transmitter 306.

Receiver 301 receives the integrated video and the arrangement information transmitted by integrated video transmission device 105. Receiver 301 may have a buffer or memory for saving received items such as videos.

Viewpoint video selector 302 selects one or more currently displayed viewpoint videos from the received integrated video using the arrangement information and selected-viewpoint information indicating the currently displayed viewpoint video(s). Viewpoint video selector 302 outputs the selected viewpoint video(s).

Video display 303 displays the one or more viewpoint videos selected by viewpoint video selector 302.

UI device 304 interprets the user's input operation and displaying a UI (User Interface). The input operation may be performed with an input device such as a mouse, keyboard, controller, or touch panel, or with a technique such as speech recognition or camera-based gesture recognition. Image display apparatus 103 may be a device (e.g., a smartphone or a tablet terminal) equipped with a sensor such as an accelerometer, so that the tilt and the like of image display apparatus 103 may be detected to acquire an input operation accordingly.

On the basis of an input operation acquired by UI device 304, UI controller 305 outputs information for switching the viewpoint video(s) being displayed. UI controller 305 also updates the content of the UI displayed on UI device 304.

On the basis of the selected-viewpoint information indicating the viewpoint video(s) selected by viewpoint video selector 302, viewing information transmitter 306 transmits viewing information to integrated video transmission device 105. The viewing information is information about the current viewing situations (e.g., index information about the selected viewpoint).

Figure 10:
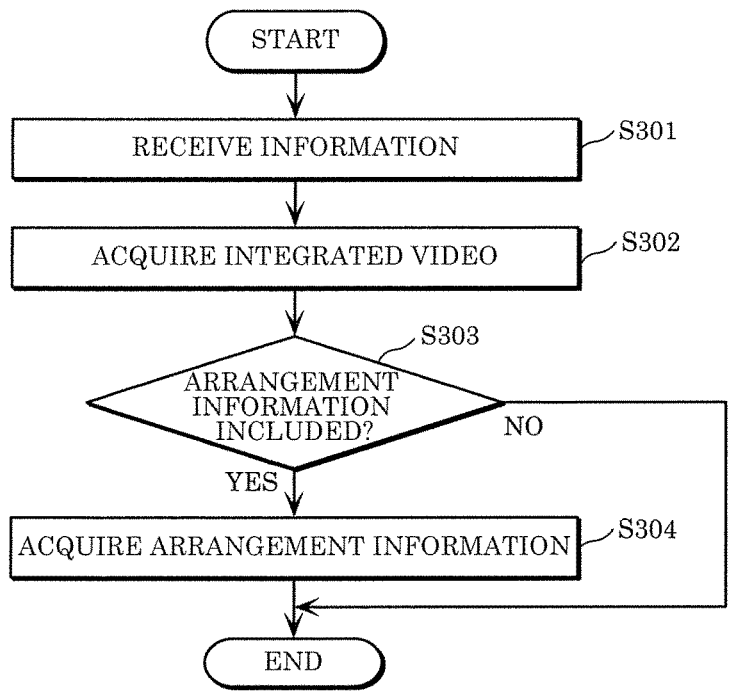
FIG. 10 is a flowchart of a receiving process according to Embodiment 1.

FIG. 10 is a flowchart indicating operations in receiver 301. First, receiver 301 receives information transmitted by integrated video transmission device 105 (S301). In streaming play mode, the transmitted information may be input to receiver 301 via a buffer capable of saving video for a certain amount of time.

If receiver 301 receives the video as a unit of sequential video frames, receiver 301 may store the received information in storage such as an HDD or memory. The video may then be played and paused as requested by a component such as viewpoint video selector 302 in subsequent processes. This allows the user to pause the video at a noticeable scene (e.g., an impactful moment in a baseball game) to view the scene from multiple directions. Alternatively, image display apparatus 103 may generate such a video.

If the video is paused while being streamed, image display apparatus 103 may skip the part of the video of the paused period and stream the subsequent part of the video. Image display apparatus 103 may also skip or fast-forward some of the frames of the buffered video to generate a digest video shorter than the buffered video, and display the generated digest video. In this manner, the video to be displayed after a lapse of a certain period can be aligned with the streaming time.

Receiver 301 acquires an integrated video included in the received information (S302). Receiver 301 determines whether the received information includes arrangement information (S303). If it is determined that the received information includes arrangement information (Yes at S303), receiver 301 acquires the arrangement information in the received information (S304).

Figure 11:
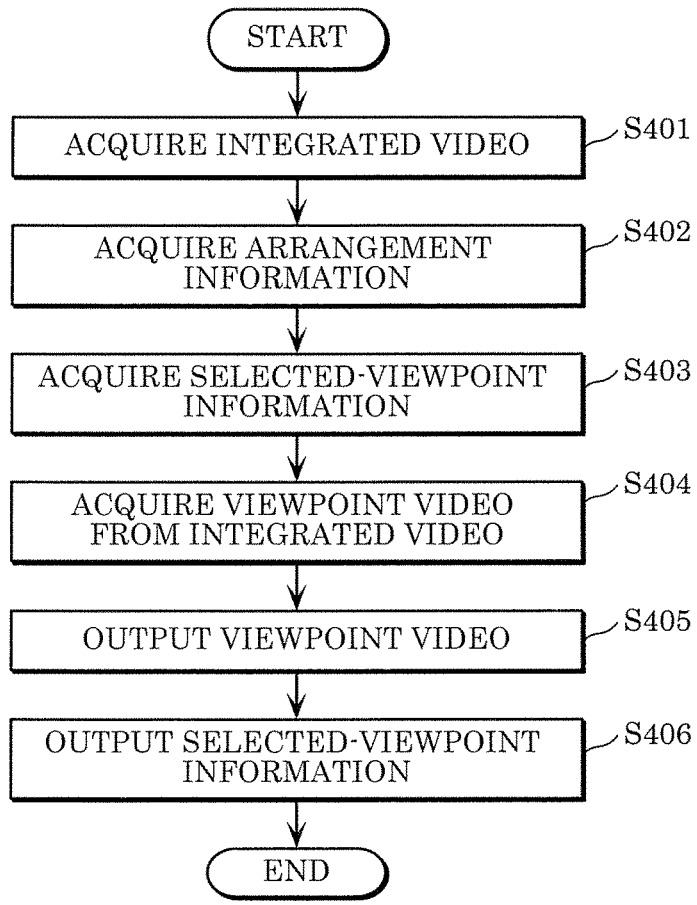
FIG. 11 is a flowchart of an image selection process according to Embodiment 1.

FIG. 11 is a flowchart indicating a process in viewpoint video selector 302. First, viewpoint video selector 302 acquires the integrated video output by receiver 301 (S401). Viewpoint video selector 302 then acquires the arrangement information output by receiver 301 (S402).

Viewpoint video selector 302 acquires, from UI controller 305, the selected-viewpoint information for determining the viewpoint for display (S403). Instead of acquiring the selected-viewpoint information from UI controller 305, viewpoint video selector 302 itself may manage information such as the previous state. For example, viewpoint video selector 302 may select the viewpoint used in the previous state.

On the basis of the arrangement information acquired at step S402 and the selected-viewpoint information acquired at step S403, viewpoint video selector 302 acquires a corresponding viewpoint video from the integrated video acquired at step S401 (S404). For example, viewpoint video selector 302 may clip out a viewpoint video from the integrated video so that a desired video is displayed on video display 303. Alternatively, video display 303 may display a viewpoint video by enlarging the area of the selected viewpoint video in the integrated video to fit the area into the display area.

For example, the arrangement information is a binary image of the same resolution as the integrated image, where 1 is set in the border portions and 0 is set in the other portions. The binary image is assigned sequential IDs starting at the upper-left corner. Viewpoint video selector 302 acquires the desired video by extracting a video in the area having an ID corresponding to the viewpoint indicated in the selected-viewpoint information. The arrangement information does not need to be an image but may be text information indicating the two-dimensional viewpoint coordinates and the resolutions.

Viewpoint video selector 302 outputs the viewpoint video acquired at step S404 to video display 303 (S405).

Viewpoint video selector 302 also outputs the selected-viewpoint information indicating the currently selected viewpoint to viewing information transmitter 306 (S406).

Not only one video but videos from multiple viewpoints may be selected on the basis of the selected-viewpoint information. For example, a video from one viewpoint and videos from neighboring viewpoints may be selected, or a video from one viewpoint and videos from other viewpoints sharing the gaze point with that video may be selected. For example, if the selected-viewpoint information indicates a viewpoint focusing on a player A from the front of the player A, viewpoint video selector 302 may select a viewpoint video in which the player A is seen from a side or the back, in addition to the front-view video.

For viewpoint video selector 302 to select multiple viewpoints, the selected-viewpoint information may simply indicate the multiple viewpoints to be selected. The selected-viewpoint information may also indicate a representative viewpoint, and viewpoint video selector 302 may estimate other viewpoints based on the representative viewpoint. For example, if the representative viewpoint focuses on a player B, viewpoint video selector 302 may select videos from viewpoints focusing on other players C and D, in addition to the representative-viewpoint video.

The initial value of the selected-viewpoint information may be embedded in the arrangement information or may be predetermined. For example, a position in the integrated video (e.g., the upper-left corner) may be used as the initial value. The initial value may also be determined by viewpoint video selector 302 according to the viewing situations such as the ratings. The initial value may also be automatically determined according to the user's preregistered preference in camera-captured subjects, which are identified with face recognition.

Figure 12:
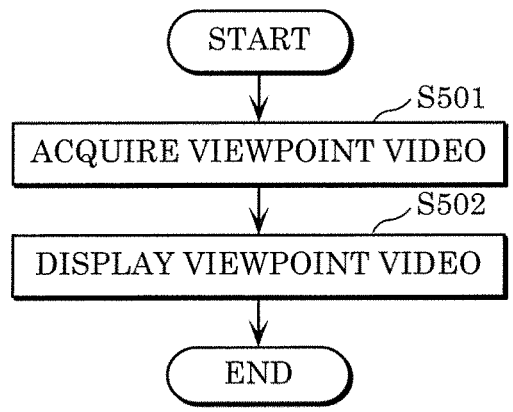
FIG. 12 is a flowchart of an image display process according to Embodiment 1.

FIG. 12 is a flowchart illustrating operations in video display 303. First, video display 303 acquires the one or more viewpoint videos output by viewpoint video selector 302 (S501). Video display 303 displays the viewpoint video (s) acquired at step S501 (S502).

Figure 13A:
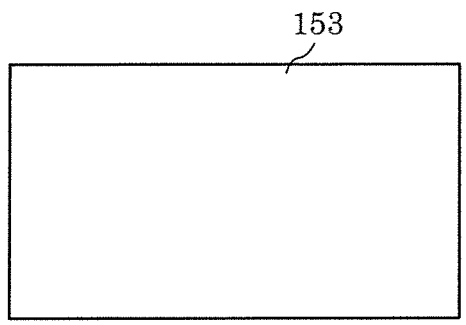
FIG. 13A is a diagram illustrating an example of displaying according to Embodiment 1.
Figure 13B:
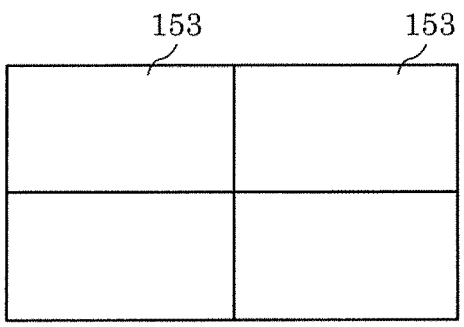
FIG. 13B is a diagram illustrating an example of displaying according to Embodiment 1.
Figure 13C:
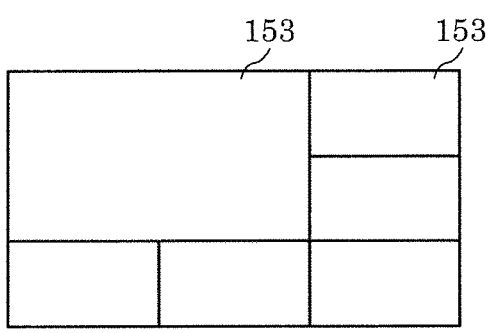
FIG. 13C is a diagram illustrating an example of displaying according to Embodiment 1.

FIGS. 13A, 13B, and 13C are diagrams illustrating exemplary display of videos on video display 303. For example, as shown in FIG. 13A, video display 303 may display one viewpoint video 153 alone. Video display 303 may also display multiple viewpoint videos 153. For example, in the example shown in FIG. 13B, video display 303 displays all viewpoint videos 153 in the same resolution. As shown in FIG. 13C, video display 303 may also display viewpoint videos 153 in different resolutions.

Image display apparatus 103 may save the previous frames of the viewpoint videos, with which an interpolation video may be generated through image processing when the viewpoint is to be switched, and the generated interpolation video may be displayed at the time of viewpoint switching. Specifically, when the viewpoint is to be switched to an adjacent viewpoint, image display apparatus 103 may generate an intermediate video through morphing processing and display the generated intermediate video. This can produce a smooth viewpoint change.

Figure 14:
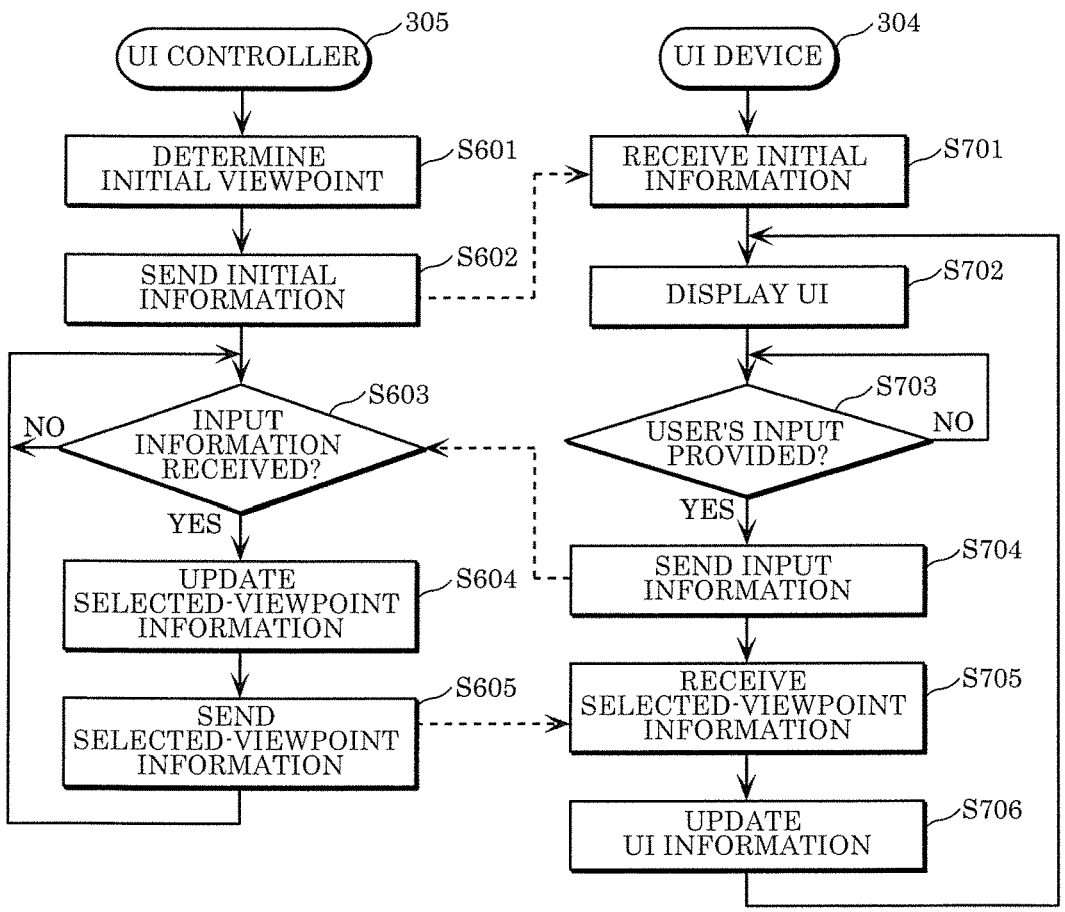
FIG. 14 is a flowchart of a UI process according to Embodiment 1.

FIG. 14 is a flowchart illustrating a process in UI device 304 and UI controller 305. First, UI controller 305 determines an initial viewpoint (S601) and sends initial information indicating the determined initial viewpoint to UI device 304 (S602).

UI controller 305 then waits for an input from UI device 304 (S603).

If the user's input information is received from UI device 304 (Yes at S603), UI controller 305 updates the selected-viewpoint information according to the input information (S604) and sends the updated selected-viewpoint information to UI device 304 (S605).

UI device 304, first, receives the initial information from UI controller 305 (S701). UI device 304 displays a UI according to the initial information (S702). As the UI, UI device 304 displays any one or a combination of two or more of the following UIs. For example, UI device 304 may display a selector button for switching the viewpoint. UI device 304 may also display a projection, like map information, indicating the two-dimensional position of each viewpoint. UI device 304 may also display a representative image of the gaze point of each viewpoint (e.g., a face image of each player).

UI device 304 may change the displayed UI according to the arrangement information. For example, if the viewpoints are concyclically arranged, UI device 304 may display a jog dial; if the viewpoints are arranged on a straight line, UI device 304 may display a UI for performing slide or flick operations. This enables the viewer's intuitive operations. Note that the above examples are for illustration, and a UI for performing slide operations may be used for a concyclic camera arrangement as well.

UI device 304 determines whether the user's input is provided (S703). This input operation may be performed via an input device such as a keyboard or a touch panel, or may result from interpreting an output of a sensor such as an accelerometer. The input operation may also use speech recognition or gesture recognition. If the videos arranged in the integrated video include videos of the same gaze point with different zoom factors, a pinch-in or pinch-out operation may cause the selected viewpoint to be transitioned to another viewpoint.

If the user's input is provided (Yes at S703), UI device 304 generates input information for changing the viewpoint on the basis of the user's input and sends the generated input information to UI controller 305 (S704). UI device 304 then receives the updated selected-viewpoint information from UI controller 305 (S705), updates UI information according to the received selected-viewpoint information (S706), and displays a UI based on the updated UI information (S702).

As above, image distribution apparatus 102 is included in image distribution system 100 in which images of a scene seen from different viewpoints are distributed to users, who can each view any of the images. Image distribution apparatus 102 generates an integrated image (such as integrated image 151A) having images 152 arranged in a frame. Image distribution apparatus 102 distributes the integrated image to image display apparatuses 103 used by the users.

In this manner, images from multiple viewpoints can be transmitted as a single integrated image, so that the same integrated image can be transmitted to the multiple image display apparatuses 103. This can simplify the system configuration. Using the single-image format can reduce changes to be made on an existing configuration and can also reduce the data amount of the distributed video with techniques such as an existing image compression technique.

At least one of the images included in the integrated image may be a virtual image (free-viewpoint image) generated from a real image.

As shown in FIGS. 2A and 2B, images 152 included in integrated image 151A or 151B may have the same resolution. This facilitates the management of images 152. In addition, because multiple images 152 can be processed in the same manner, the amount of processing can be reduced.

Alternatively, as shown in FIGS. 2C and 2D, images 152 included in integrated image 151C or 151D may include images 152 of different resolutions. In this manner, the quality of images 152, for example higher-priority images, can be improved.

The images included in the integrated image may be images at the same time point. As shown in FIG. 4, images 152 included in two or more integrated images 151F may be images at the same time point. In this manner, the number of viewpoints to be distributed can be increased.

As shown in FIG. 3, images 152A, 152B, and 152C included in integrated image 151E may include images from the same viewpoint at different time points. This allows image display apparatuses 103 to display the images correctly even if some of the images are missing due to a communication error.

Image distribution apparatus 102 may distribute arrangement information indicating the arrangement of the images in the integrated image to image display apparatuses 103. Image distribution apparatus 102 may also distribute information indicating the viewpoint of each of the images in the integrated image to image display apparatuses 103. Image distribution apparatus 102 may also distribute time information about each of the images in the integrated image to image display apparatuses 103. Image distribution apparatus 102 may also distribute information indicating the switching order of the images in the integrated image to image display apparatuses 103.

Image display apparatuses 103 are included in image distribution system 100. Each image display apparatus 103 receives an integrated image (such as integrated image 151A) having images 152 arranged in a frame. Image display apparatus 103 displays one of images 152 included in the integrated image.

In this manner, an image of any viewpoint can be displayed by using the images from multiple viewpoints transmitted as a single integrated image. This can simplify the system configuration. Using the single-image format can reduce changes to be made on an existing configuration and can also reduce the data amount of the distributed video with techniques such as an existing image compression technique.

Image display apparatus 103 may receive arrangement information indicating the arrangement of the images in the integrated image, and use the received arrangement information to acquire image 152 from the integrated image.

Image display apparatus 103 may receive information indicating the viewpoint of each of the images in the integrated image, and use the received information to acquire image 152 from the integrated image.

Image display apparatus 103 may receive time information about each of the images in the integrated image, and use the received time information to acquire image 152 from the integrated image.

Image display apparatus 103 may receive information indicating the switching order of the images in the integrated image, and use the received information to acquire image 152 from the integrated image.

Embodiment 2

In this embodiment, details of UIs in image display apparatus 103 will be described. Image display apparatus 103 is configured as shown in FIG. 9.

In this embodiment, on the basis of the input information acquired by UI device 304, UI controller 305 outputs information for switching the viewpoint video being displayed and for changing the playing speed and the playing direction.

Viewpoint video selector 302 outputs the viewpoint video according to the playing direction and the playing speed output from UI controller 305.

Figure 15:
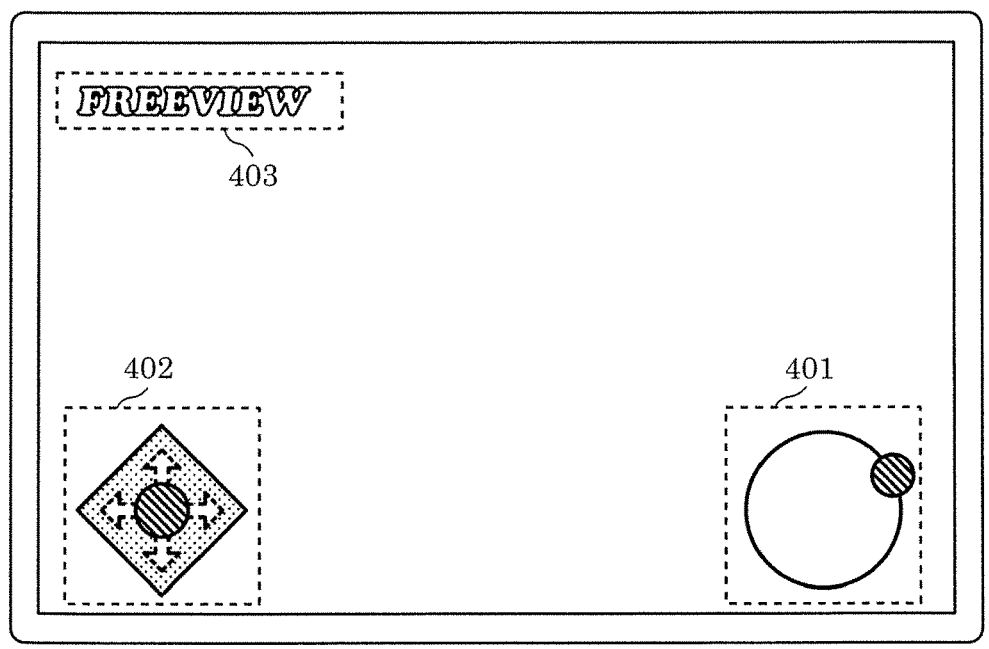
FIG. 15 is a diagram illustrating exemplary display of UIs according to Embodiment 2.

FIG. 15 is a diagram showing exemplary display of UIs in image display apparatus 103. As shown in FIG. 15, UI device 304 displays indicator 403 that presents information for a user, such as information indicating whether the viewpoint is switchable, viewpoint control UI 401 for switching the displayed video, and speed control UI 402 for controlling the playing speed, including playing and pausing. At least one of viewpoint control UI 401, speed control UI 402, and indicator 403 may be displayed to overlap the video or may be displayed in an area that does not overlap the video.

Video display 303 displays, as a displayed video, at least one of videos. Here, the videos are multi-viewpoint videos of a scene viewed from different viewpoints. For example, the videos include at least one virtual video (free-viewpoint video) generated from real video.

Viewpoint control UI 401 (a first user interface) is a UI for selecting the viewpoint of the displayed video. Viewpoint video selector 302 changes the viewpoint of the displayed video according to the user's input provided via viewpoint control UI 401.

Speed control UI 402 is a UI for changing the playing speed and the playing direction of the displayed video. Viewpoint video selector 302 changes the playing speed and the playing direction of the displayed video according to the user's input provided via speed control UI 402.

Figure 16:
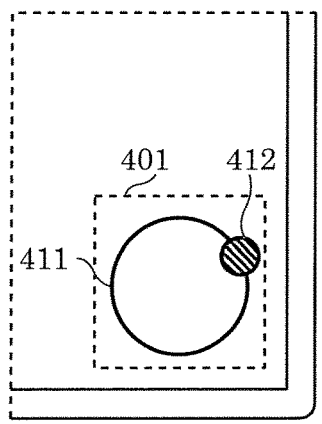
FIG. 16 is a diagram illustrating an example of a viewpoint control UI according to Embodiment 2.
Figure 17:
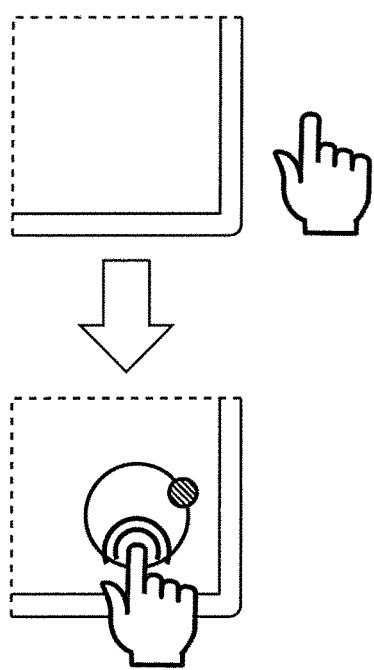
FIG. 17 is a diagram illustrating an example of display operation of a viewpoint control UI according to Embodiment 2.

Viewpoint control UI 401 will be described below. FIG. 16 is a diagram showing exemplary display of viewpoint control UI 401. FIG. 17 is a diagram showing an example of switching the display of viewpoint control UI 401 with a tap operation. UI device 304 may display viewpoint control UI 401 at all times or only when viewpoint control UI 401 is operated. For example, image display apparatus 103 may display viewpoint control UI 401 usually in transparent form, but in normal form (in nontransparent form) if viewpoint control UI 401 is operated.

Alternatively, as shown in FIG. 17, image display apparatus 103 may hide viewpoint control UI 401 when no operation is performed, but display viewpoint control UI 401 if a selection operation is performed in a predetermined specific area. Here, the selection operation may be a tap or click operation, for example. The specific area may be an area within 100 pixels from the right edge of the screen, for example.

That is, image display apparatus 103 may display viewpoint control UI 401 at a predetermined position on the screen in response to a selection operation at the predetermined position.

Image display apparatus 103 may display viewpoint control UI 401 at any selected position on the screen in response to the user's selection operation at that position. For example, viewpoint control UI 401 may be displayed at a position centered around a point at which the user has performed an operation. Alternatively, UI device 304 may display viewpoint control UI 401 at a predetermined fixed position in response to the user's selection operation at any position on the screen.

UI device 304 may display viewpoint control UI 401 only when a selection operation such as a tap operation is being performed, or may switch between displaying and hiding viewpoint control UI 401 upon every selection operation. UI device 304 may keep viewpoint control UI 401 displayed for a predetermined time period after a selection operation and hide viewpoint control UI 401 after a lapse of the predetermined time period.

The above control is applicable not only to switching between displaying and hiding but also to switching between the normal display and the transparent display.

As shown in FIG. 16, viewpoint control UI 401 includes path 411 of selectable viewpoint positions, and object 412 disposed on path 411 to indicate a viewpoint position. Moving object 412 to any position on path 411 causes the viewpoint of the displayed video to be changed to a viewpoint corresponding to the position of moved object 412 on path 411.

Here, object 412 is allowed to be moved only on path 411. Object 412 may be operated in any manner. For example, object 412 may be moved by tapping object 412 and dragging the tapped position. Alternatively, Object 412 may be moved by tapping any position on path 411 or near path 411 to cause object 412 to be moved to the tapped position on path 411 or to a position on path 411 near the tapped position.

In FIG. 16 where path 411 is circular, the inside of circular path 411 is captured, for example. That is, the gaze points exist inside the circle. The user can therefore intuitively switch the viewpoint on the predefined shape with a single operation. Path 411 is not limited to circular but may be in elliptic, rectangular, or other shapes. Path 411 does not need to have a shape surrounding the gaze points but may be linear. Further, rather than the inside of the circle, the outside of the circle may be captured.

Figure 18:
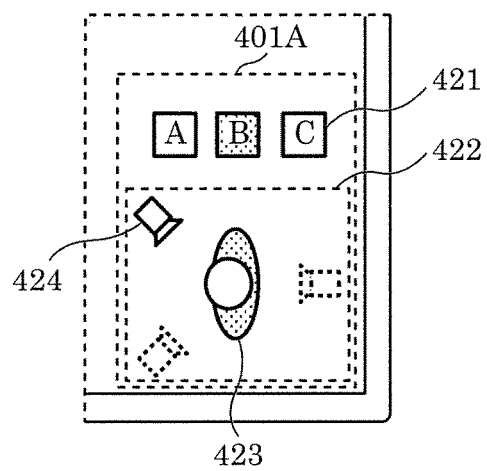
FIG. 18 is a diagram illustrating an example of a viewpoint control UI according to Embodiment 2.
Figure 19:
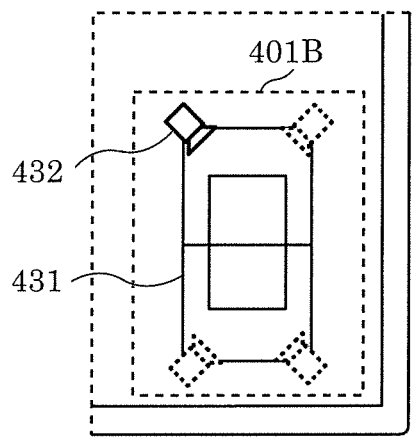
FIG. 19 is a diagram illustrating an example of a viewpoint control UI according to Embodiment 2.

FIGS. 18 and 19 are diagrams showing variations of viewpoint control UI 401. Viewpoint control UI 401A shown in FIG. 18 includes first operation section 421 for selecting any of gaze points, and second operation section 422 for selecting any of viewpoints that focus on the gaze point selected from the gaze points.

In the example shown in FIG. 18, the gaze points are players A to C. First operation section 421 includes buttons corresponding to the respective players. Pressing a button corresponding to a certain player causes second operation section 422 to display this player 423 and objects 424 representing viewpoints that focus on this player 423. If the user performs an operation of selecting one of objects 424, the displayed video is changed to a video of the viewpoint corresponding to selected object 424. In the example shown in FIG. 18, each object 424 is a camera icon representing a viewpoint position and a capturing direction (a camera orientation).

The gaze points may not be players but may be moving objects (such as humans, animals, and vehicles), still objects, or any points or areas in a three-dimensional space.

Viewpoint control UI 401B shown in FIG. 19 includes environmental information 431 that two-dimensionally or three-dimensionally represents the surrounding environment. Objects 432 corresponding to viewpoint positions are disposed on environmental information 431. Selecting any of objects 432 causes the displayed video to be changed to a video of the viewpoint position corresponding to the selected object 432. In the example shown in FIG. 19, each object 432 is a camera icon representing a viewpoint position and a capturing direction (a camera orientation).

Although environmental information 431 is a top view of a court in the example shown in FIG. 19, environmental information 431 may be in other forms such as map information or a floor plan. Environmental information 431 may also be other views such as a perspective view, rather than a top view.

The above-described specific examples of viewpoint control UI 401 are exemplary; any UIs capable of specifying a video to be displayed out of the integrated video may be employed.

For example, although the above description illustrates the example in which the two-dimensional position of a viewpoint is selected, the height may be selected in addition to the two-dimensional position. In this case, a side view for selecting the height may be displayed in addition to the top view, or an operation section for switching between the top view and the side view may be provided. Alternatively, a perspective view that enables the user to see the two-dimensional position and the height may be used, or an operation section for changing the angle of environmental information 431 and the like may be provided.

Multiple videos may be displayed, for example on the screen partitioned into sub-screens. UI device 304 may then display viewpoint control UI 401 for each video, so that the viewpoints of the videos may be individually changed. That is, viewpoint control UI 401 is displayed for each of the displayed videos. In response to an operation on corresponding viewpoint control UI 401, the viewpoint of the corresponding video is changed.

Alternatively, in synchronization with change of the viewpoint of one video, the viewpoints of the other videos may be switched. That is, the viewpoints of the displayed videos may be changed in response to an operation on one viewpoint control UI 401. If the videos are to be synchronously switched in this manner, only one viewpoint control UI 401 may be displayed or multiple viewpoint control UIs 401 may be displayed.

For example, in the UI shown in FIG. 16, moving the viewpoint position rightward causes the viewpoints of the respective videos to be moved rightward. If videos are being displayed that show a player A viewed from multiple viewpoints and an operation is performed for switching the target player from the player A to a player B, videos showing the player B viewed from multiple viewpoints are displayed.

Figure 20:
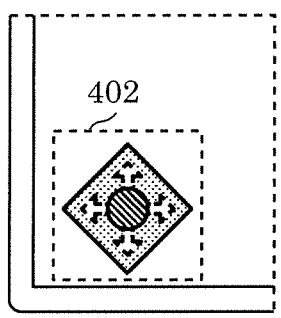
FIG. 20 is a diagram illustrating exemplary display of a speed control UI according to Embodiment 2.
Figure 21:
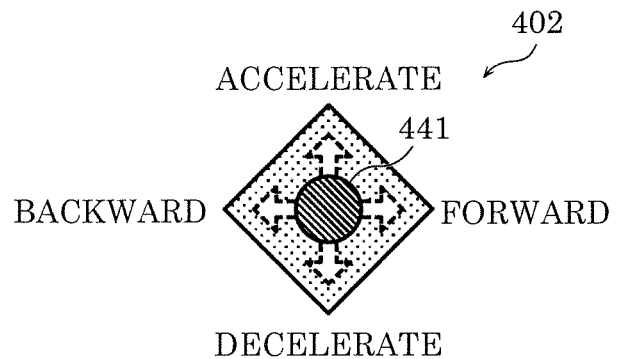
FIG. 21 is a diagram illustrating an example of a speed control UI according to Embodiment 2.

Now, speed control UI 402 will be described. FIG. 20 is a diagram showing exemplary display of speed control UI 402. FIG. 21 is a diagram for describing operations with speed control UI 402.

Speed control UI 402 is a UI for pausing the displayed video, changing the playing speed, and changing the playing direction (forward and backward).

Speed control UI 402 shown in FIG. 21 is a UI based on stick operations and includes object 441. The user can move object 441 in a first direction (the vertical direction in FIG. 21) to change the playing speed. The user can move object 441 in a second direction (the horizontal direction in FIG. 21) orthogonal to the first direction to change the playing direction.

Thus, video playing is controlled by changing the position of round object 441 at the center. Specifically, the playing speed is controlled in the vertical direction (the upward direction corresponds to acceleration and the downward direction corresponds to deceleration). The speed depends on the position in the vertical direction; the playing speed is higher if object 441 is positioned higher, and the playing speed is lower if object 441 is positioned lower. The temporal direction is controlled in the horizontal direction (the leftward direction corresponds to backward playing and the rightward direction corresponds to forward playing). The displayed video is paused if object 441 is positioned at the center.

Figure 22:
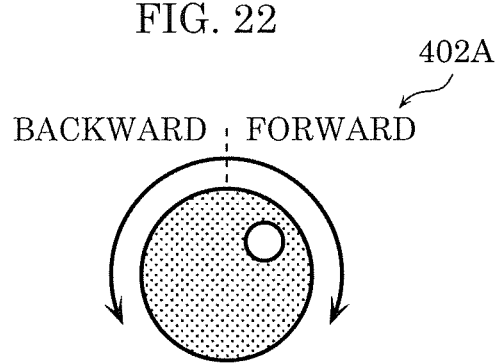
FIG. 22 is a diagram illustrating an example of a speed control UI according to Embodiment 2.
Figure 23:
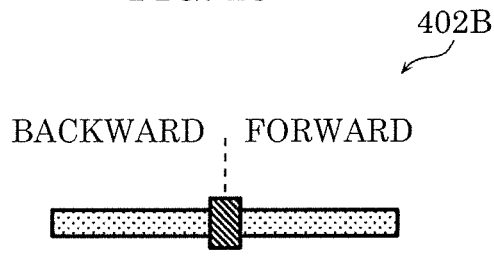
FIG. 23 is a diagram illustrating an example of a speed control UI according to Embodiment 2.

FIGS. 22 and 23 are diagrams showing variations of speed control UI 402. Speed control UI 402A shown in FIG. 22 is a dial-shaped UI in which video playing is controlled according to the rotation direction and the amount of rotation. That is, speed control UI 402A includes a dial such that the playing speed is changed according to the amount of rotation of the dial, and the playing direction is changed according to the rotation direction of the dial.

Specifically, the video is played backward if the dial is rotated leftward, and played forward if the dial is rotated rightward. The larger the amount of rotation is, the faster the video is played. The video is paused if the amount of rotation from the initial position is zero.

Speed control UI 402B shown in FIG. 23 is a slide bar UI in which video playing is controlled according to the amount of sliding and the sliding direction. That is, speed control UI 402B includes a slide bar such that the playing speed is changed according to the amount of sliding on the slide bar, and the playing direction is changed according to the sliding direction on the slide bar. The video is paused if the slider is at the initial position.

As with viewpoint control UI 401, speed control UI 402 may be displayed at all times, or may be hidden or transparently displayed when not operated.

As with viewpoint control UI 401, if multiple videos are displayed, speed control UI 402 may be displayed for each of the displayed videos. In response to an operation on speed control UI 402, the playing speed and the playing direction of the corresponding video may be changed. Alternatively, the playing speed and the playing direction of the displayed videos may be changed in response to an operation on one speed control UI 402.

When the user stops the operation on speed control UI 402, the playing of the displayed video may be controlled in any of the following manners.

When the operation on speed control UI 402 is finished, the displayed video may be displayed at a predetermined playing speed and in a predetermined playing direction. For example, the video is automatically set to be played forward at a predetermined standard playing speed.

Alternatively, the settings at the time of stopping the operation may be maintained. That is, when the operation on speed control UI 402 is finished, the playing speed and the playing direction at the time of finishing the operation may be maintained.

Alternatively, either one of the playing speed and the temporal direction may be kept at the setting at the time of stopping the operation, and the other one may be automatically set to a standard setting. That is, when the operation on speed control UI 402 is finished, one of the playing speed and the playing direction may remain in the state at the time of finishing the operation, and the other may return to a predetermined state. For example, the playing direction may be maintained and the playing speed may be set to a predetermined speed. Different playing speeds may be predetermined for forward playing and backward playing.

Alternatively, when the operation is stopped, the playing of the displayed video may be paused with an image at the time of stopping the operation being displayed.

When an operation for backward playing is performed, the video may be played backward while the display viewpoint at the time of the operation is maintained. Alternatively, image display apparatus 103 may save information about previous viewpoint switching and, on the basis of this information, may play the video backward while changing the viewpoint in the reverse viewpoint-switching order.

Figure 24:
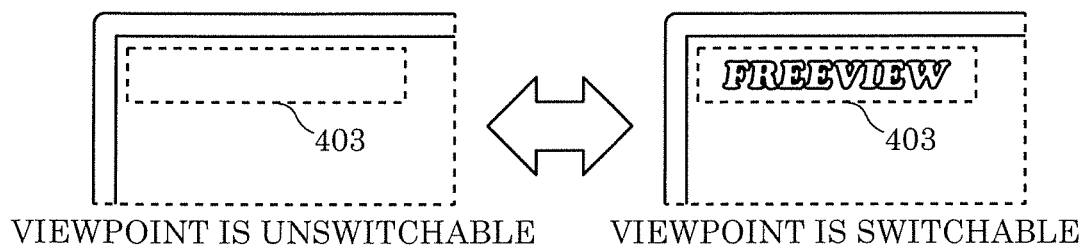
FIG. 24 is a diagram illustrating an exemplary display of an indicator according to Embodiment 2.

Now, indicator 403 will be described. FIG. 24 is a diagram showing exemplary display of indicator 403. Indicator 403 is used for notifying the user (viewer) whether the viewpoint is switchable.

Figure 25:
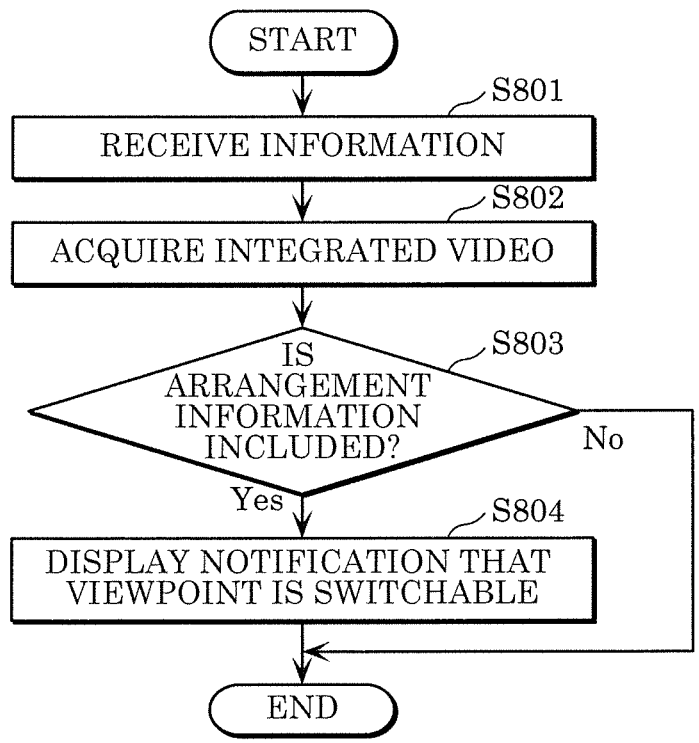
FIG. 25 is a flowchart of a receiving process according to Embodiment 2.

FIG. 25 is a flowchart showing an exemplary process in image display apparatus 103. Processing at steps S801 to S803 is the same as the processing at steps S301 to S303 shown in FIG. 10. For example, as shown in FIG. 25, if the received information includes the arrangement information (Yes at S803), image display apparatus 103 notifies the user that the viewpoint is switchable (S804). For example, as shown in FIG. 24, indicator 403 displays an icon indicating that the viewpoint is switchable.

Rather than displaying the predetermined icon in the specific area, other manners may be used to notify the user whether the viewpoint is switchable. For example, viewpoint control UI 401 or the like may be displayed if the viewpoint is switchable, while not be displayed if the viewpoint is unswitchable. Sounds such as sound effects may be provided for notifying that the viewpoint is switchable or whether the viewpoint is switchable. Image display apparatus 103 may vibrate to notify that the viewpoint is switchable or whether the viewpoint is switchable. Thus, any presentation manner may be used that can notify the user that the viewpoint is switchable.

Figure 26:
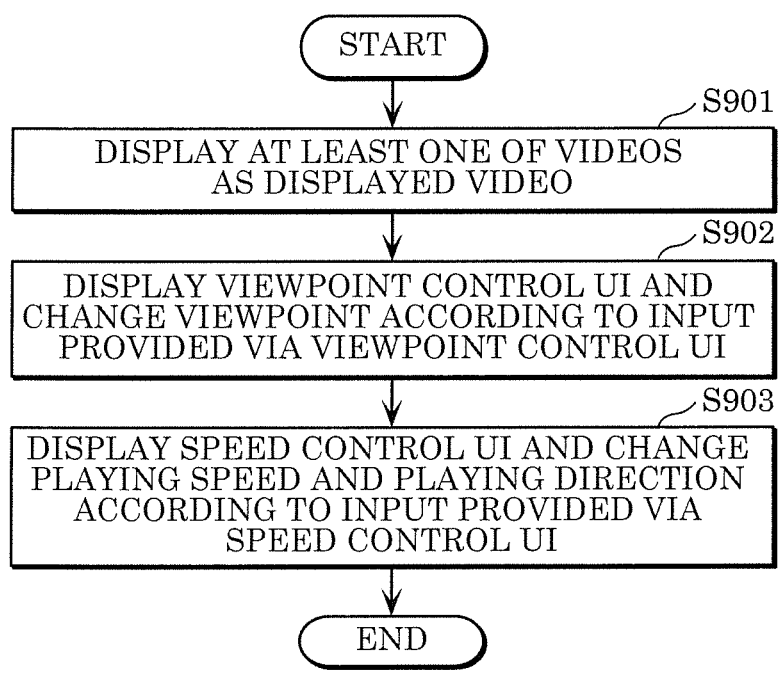
FIG. 26 is a flowchart of an image display process according to Embodiment 2.

Image display apparatus 103 according to this embodiment thus performs a process shown in FIG. 26. Video display 303 displays, as a displayed video, at least one of videos that show a scene viewed from different viewpoints and that include at least one virtual video generated from real video (S901).

A viewpoint changer (UI device 304, UI controller 305, and viewpoint video selector 302) displays viewpoint control UI 401 (the first user interface) for selecting the viewpoint of the displayed video, and changes the viewpoint of the displayed video according to an input provided via viewpoint control UI 401 (S902).

A speed changer (UI device 304, UI controller 305, and viewpoint video selector 302) displays speed control UI 402 (the second user interface) for changing the playing speed and the playing direction of the displayed video, and changes the playing speed and the playing direction of the displayed video according to an input provided via speed control UI 402 (S903).

Embodiment 3

In this embodiment, the process of changing the resolution of an image displayed by image display apparatus 103 will be described. Image distribution system 100, image distribution apparatus 102, and image display apparatus 103 are generally configured as in Embodiment 1.

Figure 27:
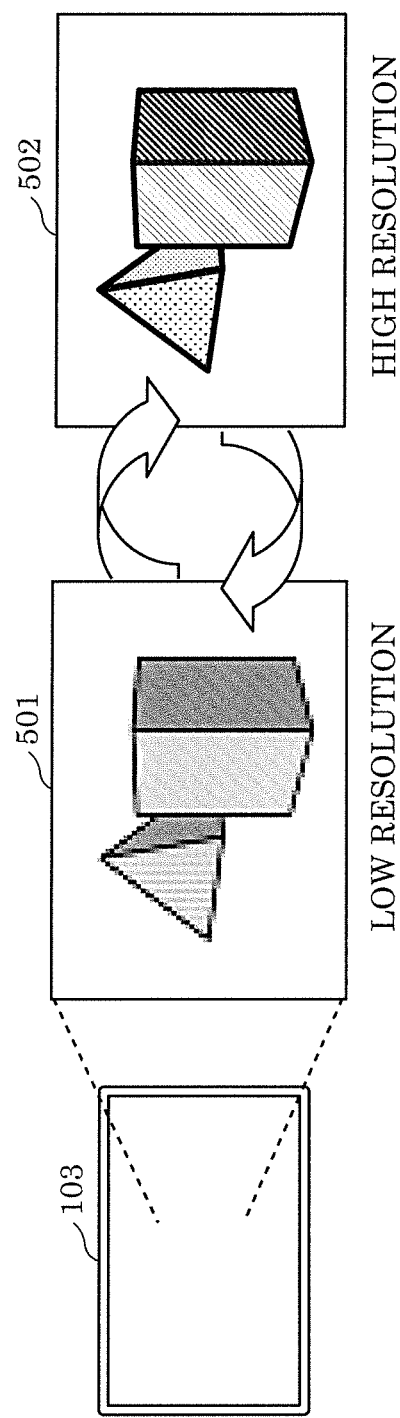
FIG. 27 is a diagram schematically illustrating an example of switching the displayed video according to Embodiment 3.

FIG. 27 is a diagram schematically illustrating an example of switching the displayed video in image display apparatus 103. Video display 303 in image display apparatus 103 displays free-viewpoint video. Image display apparatus 103 also displays images by switching between low-resolution image 501 and high-resolution image 502. For example, low-resolution image 501 here is one of the videos in the integrated video described in Embodiment 1, or one of the images in the integrated image described in Embodiment 1. High-resolution image 502 is an image or a video seen from the same viewpoint as low-resolution image 501 and having a higher resolution than low-resolution image 501.

Instead of displaying images by switching between low-resolution image 501 and high-resolution image 502, image display apparatus 103 may display images by overlaying high-resolution image 502 on low-resolution image 501.

Figure 28:
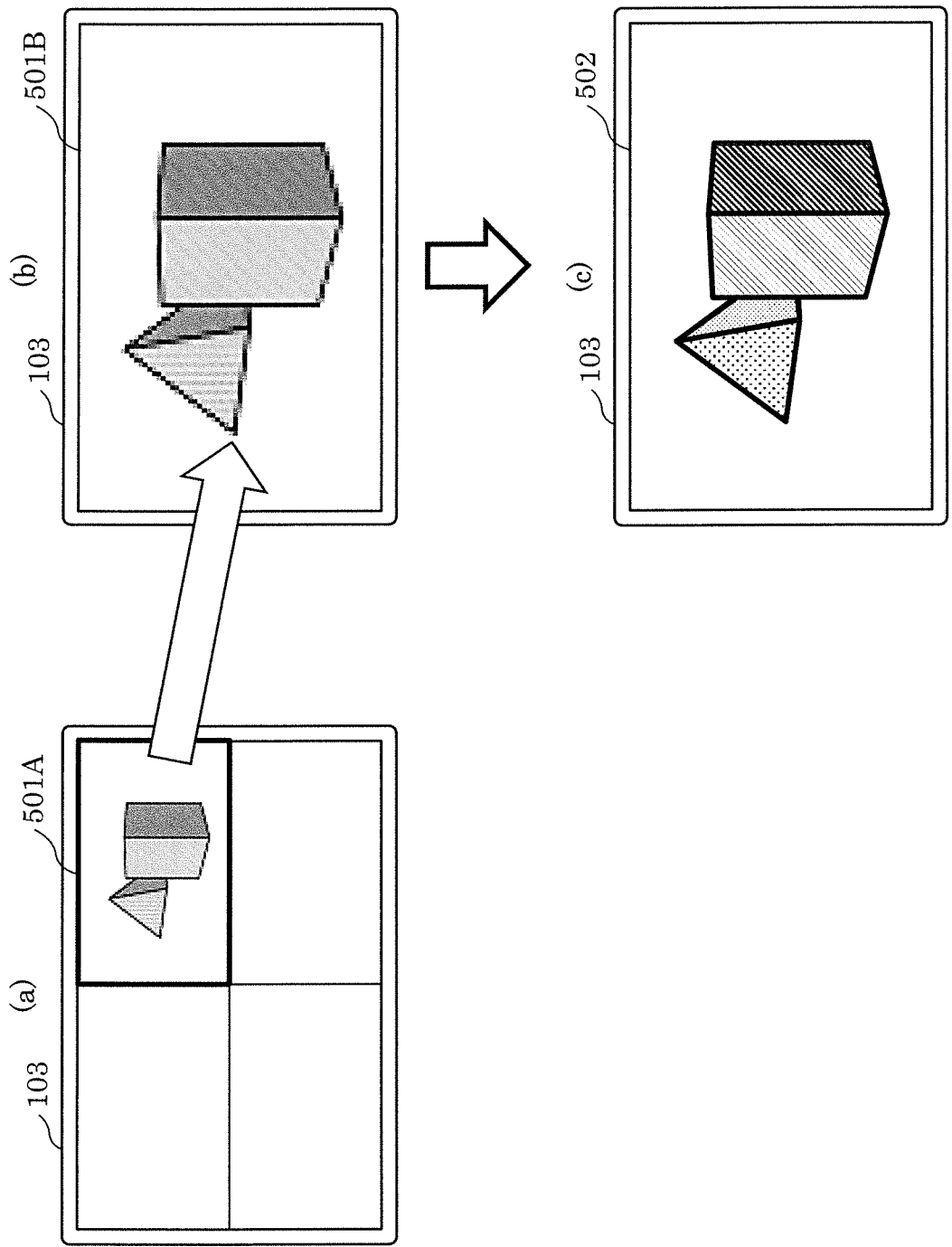
FIG. 28 is a diagram schematically illustrating an example of switching the displayed video according to Embodiment 3.

FIG. 28 is a diagram schematically illustrating an example of switching the displayed video in image display apparatus 103. First, image display apparatus 103 displays an integrated video that includes low-resolution images 501, as shown in (a) in FIG. 28. In this state, a user of image display apparatus 103 selects low-resolution image 501A, for example. As a result, low-resolution image 501B, which is enlarged low-resolution image 501A, is displayed as shown in (b) in FIG. 28. That is, low-resolution image 501B is larger than low-resolution image 501A in size. Then, in response to, e.g., a predetermined operation by the user, low-resolution image 501B is switched to high-resolution image 502. For example, high-resolution image 502 has the same size as low-resolution image 501B. It is to be noted that low-resolution image 501A may be temporarily enlarged and displayed as low-resolution image 501B, or low-resolution image 501B may be managed separately from low-resolution image 501A.

Although the integrated video includes four low-resolution images in the example illustrated here, the integrated video may include any number of low-resolution images other than four. Further, not only one but multiple low-resolution images may be selected and simultaneously displayed in an enlarged size on a partitioned screen.

Instead of being directly selected in the integrated video, low-resolution image 501A may be selected with, e.g., a UI as described in the other embodiments. That is, the integrated video may not necessarily be displayed.

In the example illustrated here, high-resolution image 502 is displayed after low-resolution image 501B is displayed as in (b) in FIG. 28. Alternatively, low-resolution image 501B may not be displayed and high-resolution image 502 may be immediately displayed.

Figure 29:
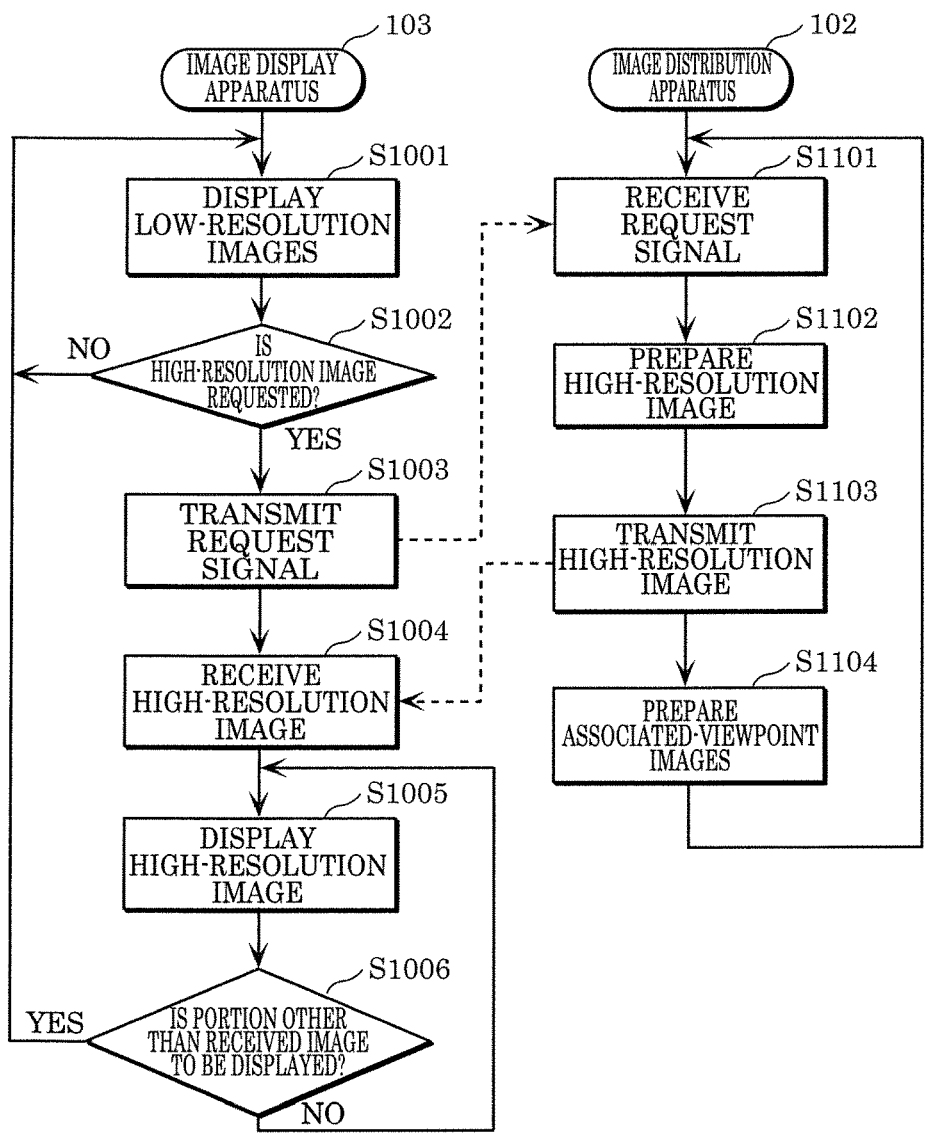
FIG. 29 is a flowchart of the operations in an image display apparatus and an image distribution apparatus according to Embodiment 3.

Now, the flow of operations in image display apparatus 103 (a display terminal) and image distribution apparatus 102 (a server) will be described. FIG. 29 is a flowchart illustrating the operations in image display apparatus 103 and image distribution apparatus 102.

First, image display apparatus 103 displays an integrated video being received (S1001). The integrated video here includes low-resolution images 501. Instead of simply displaying the integrated video as it is, image display apparatus 103 may select one or more of low-resolution images 501 in the integrated video and display the selected one or more of low-resolution images 501.

Image display apparatus 103 determines whether to request high-resolution image 502 from image distribution apparatus 102 (S1002). For example, image display apparatus 103 determines to request high-resolution image 502 if a predetermined operation is performed by the user. This operation is performed with, for example, a button provided by UI device 304 of image display apparatus 103. As another example, image display apparatus 103 determines to request high-resolution image 502 if the same viewpoint is continuously viewed for a predetermined time period, or if no viewpoint changing operation nor timepoint changing operation is performed while display is being paused.

If image display apparatus 103 determines not to request high-resolution image 502 (No at S1002), image display apparatus 103 returns to step S1001. If image display apparatus 103 determines to request high-resolution image 502 from image distribution apparatus 102 (Yes at S1002), image display apparatus 103 transmits a request signal to image distribution apparatus 102 requesting to send high-resolution image 502 (S1003). This request signal includes viewpoint information indicating the viewpoint of requested high-resolution image 502, or time information indicating the timepoint or time segment of requested high-resolution image 502.

Image display apparatus 103 receives high-resolution image 502 transmitted by image distribution apparatus 102 (S1004).

Image display apparatus 103 displays high-resolution image 502 received at step S1004 on video display 303 (S1005).

According to viewpoint change or play-timepoint change instructed by, e.g., the user's operation, image display apparatus 103 determines whether to display a portion other than high-resolution image 502 received at step S1004 (S1006). If high-resolution image 502 is to be continuously displayed and therefore the received data exists (No at S1006), image display apparatus 103 continues displaying high-resolution image 502 (S1005). If another portion is to be displayed and therefore no received data exists (Yes at S1006), image display apparatus 103 displays low-resolution images 501 (S1001).

The operations in image distribution apparatus 102 will now be described. Image distribution apparatus 102 receives the request signal for high-resolution image 502 from image display apparatus 103 (S1101). Image distribution apparatus 102 prepares high-resolution image 502 based on the request signal (S1102). For example, if high-resolution image 502 is a still image, the request signal includes information indicating the viewpoint of requested high-resolution image 502 and information indicating which timepoint in the video the image is located at. If high-resolution image 502 is a video, the request signal includes information indicating the viewpoint of requested high-resolution image 502. Image distribution apparatus 102 may store high-resolution images 502 seen from multiple viewpoints in advance and obtain high-resolution image 502 seen from the requested viewpoint among stored high-resolution images 502. Alternatively, image distribution apparatus 102 may generate, as needed, high-resolution image 502 for the viewpoint and timepoint indicated in the request signal from original images (camera images) or from a three-dimensional model.

Image distribution apparatus 102 transmits high-resolution image 502 prepared at step S1102 to image display apparatus 103 (S1103).

If there are images or videos seen from associated viewpoints (which are viewpoints associated with the viewpoint indicated in the request signal received at step S1101), image distribution apparatus 102 prepares relevant data, such as by generating high-resolution images seen from the associated viewpoints (S1104).

Figure 30:
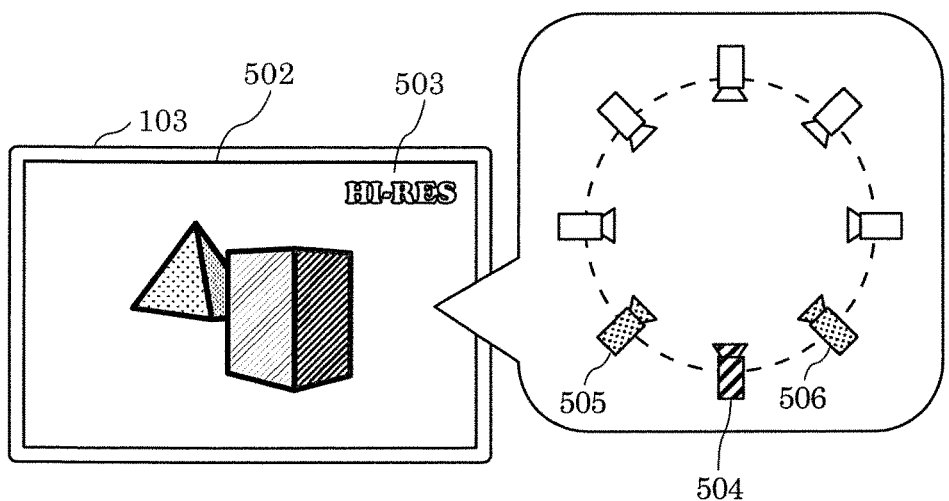
FIG. 30 is a diagram illustrating an example of a displayed image and associated viewpoints according to Embodiment 3.

FIG. 30 is a schematic diagram for describing the associated-viewpoint images at step S1104. For example, as shown in FIG. 30, if viewpoint 504 is indicated in the request signal received at step S1101, image distribution apparatus 102 determines viewpoints positionally close to viewpoint 504 to be associated viewpoints 505 and 506, and prepares high-resolution images 502 seen from associated viewpoints 505 and 506. For example, as shown in FIG. 30, associated viewpoints 505 and 506 are viewpoints adjacent to viewpoint 504, for example viewpoints on both sides of viewpoint 504.

High-resolution mode, in which high-resolution image 502 is displayed, may allow a viewpoint to be selected with finer granularity than normal mode, in which low-resolution images 501 are displayed. In other words, more viewpoints may be selectable in high-resolution mode than in normal mode. For example, N viewpoints concentrically located around the gaze point may be selectable in normal mode, whereas 2N viewpoints concentrically located around the gaze point may be selectable in high-resolution mode (e.g., while the video is being stopped).

In high-resolution mode, the frame rate of the video may be increased. For example, in normal mode such as when the video is being distributed, the frame rate of the video (low-resolution images 501) being distributed may be 30 fps. By contrast, in high-resolution mode such as when the video is stopped, played forward frame by frame, or played backwards frame by frame, images may be selected from high-resolution images 502 of a frame rate of 60 fps.

In high-resolution mode, indicator 503 may be displayed as shown in FIG. 30. User operations may be restricted in this state. For example, operations for resuming the video playing and for switching the viewpoint may be inhibited in high-resolution mode.

Figure 31:
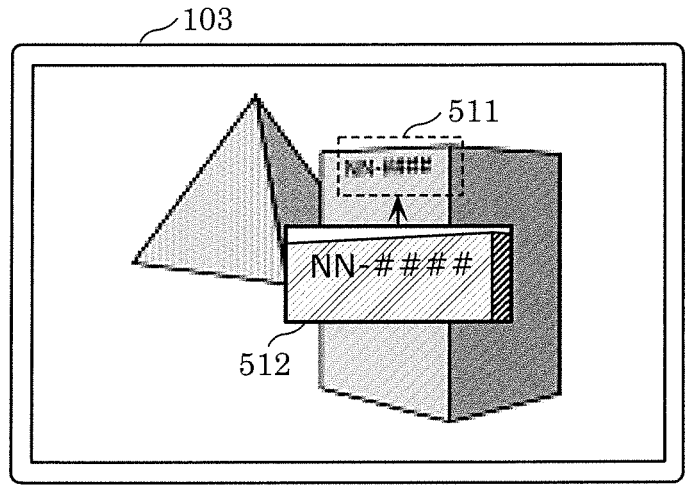
FIG. 31 is a diagram illustrating an example of a displayed image according to Embodiment 3.

In high-resolution mode, not the entire image but only specific area 511 in the image may be displayed in high resolution. FIG. 31 is a diagram illustrating an exemplary displayed image in this case. Specific area 511 here is a key area in the image, for example an area containing a face or an area containing characters, such as characters on a license plate of a car.

For example, image distribution apparatus 102 distributes information indicating specific area 511 along with the image. Image display apparatus 103 displays the information indicating specific area 511 as a dotted-line rectangular shown in FIG. 31. If the dotted-line rectangular indicating specific area 511 is operated (selected), image display apparatus 103 displays high-resolution image 512 of specific area 511. Alternatively, image display apparatus 103 may always display high-resolution image 512 of specific area 511.

As shown in FIG. 31, image display apparatus 103 may display high-resolution image 512 in a separate window with an indication of the relationship with specific area 511. Instead of displaying in a separate window, image display apparatus 103 may display high-resolution image 512 to be overlaid on specific area 511.

For prompting the user's recognition of specific area 511, viewpoint control UI 401B shown in FIG. 19 displaying the camera arrangement may present a recommended viewpoint that facilitates the view of specific area 511, or a timepoint for each viewpoint that facilitates the view of specific area 511 from that viewpoint. For example, the recommended viewpoint may be a viewpoint from which vehicles can be captured from the front or rear direction in an environment such as a crossing, such that vehicle numbers are easily recognized. The recommended viewpoint may also be a viewpoint capable of recognizing the face of a focus person in a concert or game. The timepoint of a particular scene (such as a shoot scene) of the focus person may also be presented.

Image display apparatus 103 may display the result of analyzing three-dimensional information. For example, image distribution apparatus 102 may recognize vehicles from three-dimensional information and detect the speed of each vehicle. Image display apparatus 103 may then display the speed information obtained.

Figure 32:
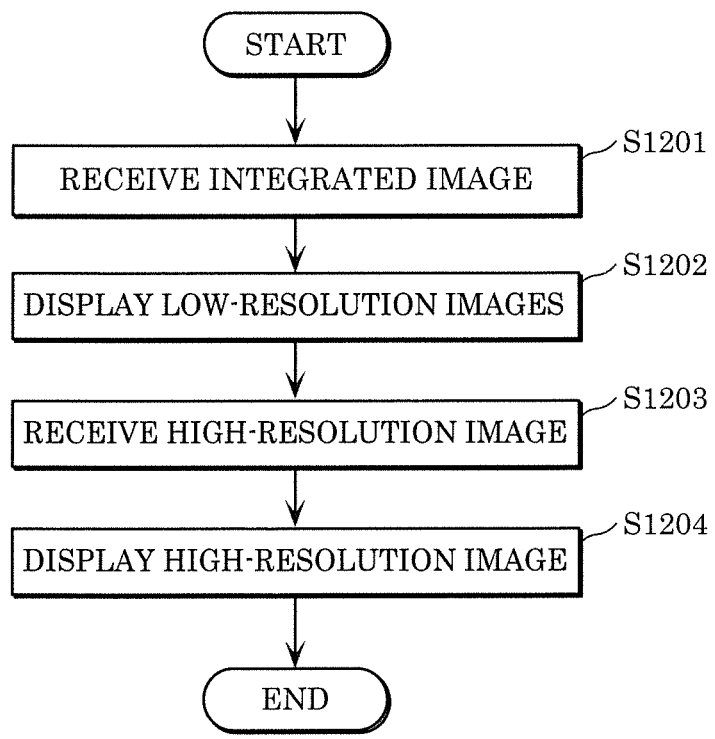
FIG. 32 is a flowchart of an image display process according to Embodiment 3.

Thus, image display apparatus 103 according to this embodiment performs the process shown in FIG. 32. First, image display apparatus 103 receives an integrated image in which low-resolution images 501 of a scene seen from different viewpoints are arranged in a frame (S1201). Image display apparatus 103 then displays at least one of low-resolution images 501 included in the received integrated image (S1202).

Image display apparatus 103 receives high-resolution image 502 seen from the same viewpoint as and having a higher resolution than a selected one of low-resolution images 501 (S1203). Image display apparatus 103 displays received high-resolution image 502 (S1204).

In this manner, an increase in the amount of data to be distributed can be prevented using the integrated image in which low-resolution images 501 are arranged in a frame. Image display apparatus 103 can display images by switching between low-resolution image 501 and high-resolution image 502, thereby providing a video of high image quality to the user. Image display apparatus 103 can thus improve usability for the user viewing the video while preventing an increase in the amount of data to be distributed.

For example, at step S1202, image display apparatus 103 displays the integrated image ((a) in FIG. 28). At step S1204, image display apparatus 103 displays high-resolution image 502 in a second size larger than a first size of the selected low-resolution image as displayed in the integrated image ((c) in FIG. 28).

For example, after displaying the integrated image, image display apparatus 103 displays the selected low-resolution image in a third size larger than the first size ((b) in FIG. 28). After displaying the selected low-resolution image in the third size, image display apparatus 103 displays high-resolution image 502 in the second size ((c) in FIG. 28).

For example, if the user's predetermined operation is received, image display apparatus 103 transitions from normal mode in which low-resolution images 501 are received and displayed to high-resolution mode in which high-resolution image 502 is received and displayed.

For example, the selected low-resolution image is a video, and the predetermined operation is an operation for pausing the selected low-resolution image. This allows providing an image of high image quality to the user while preventing an increase in the amount of data to be distributed.

For example, the selected low-resolution image is a video, and the predetermined operation is a frame-by-frame advance operation or a slow-motion replay operation for the selected low-resolution image. In high-resolution mode, image display apparatus 103 receives a high-resolution image having a higher frame rate than the selected low-resolution image, and displays the received high-resolution image frame by frame or plays the received high-resolution image at a slow speed. This allows providing an image or a video of high image quality to the user in high-resolution mode.

For example, in high-resolution mode, more viewpoints are selectable than in normal mode. This allows increasing the number of viewpoints selectable by the user in high-resolution mode.

For example, as shown in FIG. 31, high-resolution image 512 is a high-resolution image of a partial area (specific area 511) in the selected low-resolution image. This allows only a partial area to be displayed in high resolution, thereby preventing an increase in the amount of data. For example, the partial area is an area containing a face or characters.

Figure 33:
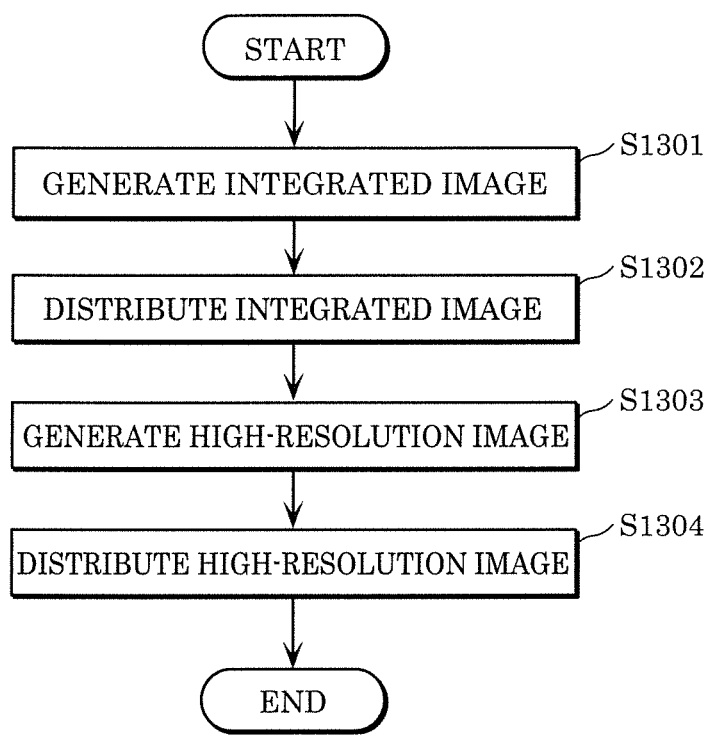
FIG. 33 is a flowchart of an image display process according to Embodiment 3.

Image distribution apparatus 102 according to this embodiment performs the process shown in FIG. 33. First, image distribution apparatus 102 generates an integrated image in which low-resolution images 501 of a scene seen from different viewpoints are arranged in a frame (S1301). Image distribution apparatus 102 then distributes the generated integrated image to image display apparatus 103 (S1302).

In response to a request from image display apparatus 103, image distribution apparatus 102 generates high-resolution image 502 seen from the same viewpoint as and having a higher resolution than a selected one of low-resolution images 501 included in the integrated image (S1303). Image distribution apparatus 102 distributes generated high-resolution image 502 to image display apparatus 103 (S1304).

In this manner, an increase in the amount of data to be distributed can be prevented using the integrated image in which low-resolution images 501 are arranged in a frame. Image display apparatus 103 can display images by switching between low-resolution image 501 and high-resolution image 502, thereby providing a video of high image quality to the user. Image distribution apparatus 102 can thus improve usability for the user viewing the video while preventing an increase in the amount of data to be distributed.

For example, if image display apparatus 103 receives the user's predetermined operation, image distribution apparatus 102 transitions from normal mode in which low-resolution images 501 are distributed to high-resolution mode in which high-resolution image 502 is distributed.

For example, the selected low-resolution image is a video, and the predetermined operation is an operation for pausing the selected low-resolution image. This allows providing an image of high image quality to the user while preventing an increase in the amount of data to be distributed.

For example, the selected low-resolution image is a video, and the predetermined operation is a frame-by-frame advance operation or a slow-motion replay operation for the selected low-resolution image. In high-resolution mode, image distribution apparatus 102 distributes high-resolution image 502 having a higher frame rate than the selected low-resolution image to image display apparatus 103. This allows providing an image or a video of high image quality to the user in high-resolution mode.

For example, in high-resolution mode, more viewpoints are selectable by the user than in normal mode. This allows increasing the number of viewpoints selectable by the user in high-resolution mode.

For example, as shown in FIG. 31, high-resolution image 512 is a high-resolution image of a partial area (specific area 511) in the selected low-resolution image. This allows only a partial area to be displayed in high resolution, thereby preventing an increase in the amount of data. For example, the partial area is an area containing a face or characters.

For example, as shown in FIG. 30, when distributing high-resolution image 502 corresponding to the selected low-resolution image to image display apparatus 103, image distribution apparatus 102 generates an image that is seen from a viewpoint close to the viewpoint of the selected low-resolution image among the viewpoints of low-resolution images 501 and that has a higher resolution than the low-resolution images. This allows reducing the time before video is displayed after the viewpoint is switched.

Although an image distribution system, an image distribution apparatus, and an image display apparatus according to exemplary embodiments of the present disclosure have been described above, the present disclosure is not limited to such embodiments.

Note that each of the processing units included in the image distribution system according to the embodiments is implemented typically as a large-scale integration (LSI), which is an integrated circuit (IC). They may take the form of individual chips, or one or more or all of them may be encapsulated into a single chip.

Furthermore, the integrated circuit implementation is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Furthermore, the present disclosure may be embodied as various methods performed by the image distribution system, the image distribution apparatus, or the image display apparatus.

Furthermore, the divisions of the blocks shown in the block diagrams are mere examples, and thus a plurality of blocks may be implemented as a single block, or a single block may be divided into a plurality of blocks, or one or more blocks may be combined with another block. Also, one or more blocks may be implemented in single hardware or by software.

Furthermore, the processing order of executing the steps shown in the flowcharts is a mere illustration for specifically describing the present disclosure, and thus may be an order other than the shown order. Also, one or more of the steps may be executed simultaneously (in parallel) with another step.

Although the image distribution system according to one or more aspects has been described on the basis of the exemplary embodiments, the present disclosure is not limited to such embodiments. The one or more aspects may thus include forms obtained by making various modifications to the above embodiments that can be conceived by those skilled in the art, as well as forms obtained by combining structural components in different embodiments, without materially departing from the spirit of the present disclosure.

INDUSTRIAL APPLICABILITY

The present disclosure is applicable to image distribution systems and image distribution methods, for example, free-viewpoint video generation systems and next-generation monitoring systems.

What is claimed is:

1. An image display method comprising:
    receiving an integrated image in which low-resolution images of a scene from different viewpoints are arranged;
    displaying the integrated image such that a low-resolution image among the low-resolution images is displayed in a first size;
    receiving a high-resolution image having a same viewpoint as the low-resolution image, the high-resolution image having a higher resolution than the low-resolution image;
    displaying the high-resolution image in a second size larger than the first size; and
    displaying the low-resolution image in a third size larger than the first size after the integrated image is displayed and before the high-resolution image is displayed in the second size, wherein
    when displaying the high-resolution image, more viewpoints are selectable than when displaying the low-resolution image.

2. The image display method according to claim 1, further comprising:
    selecting the low-resolution image from among the low-resolution images according to an operation by a user.

3. The image display method according to claim 1, wherein
    the second size is same as the third size.

4. The image display method according to claim 1, comprising:
    transitioning from normal mode in which the low-resolution images are received and displayed to high-resolution mode in which the high-resolution image is received and displayed, when a predetermined operation by a user is received.

5. The image display method according to claim 4, wherein
    the low-resolution image is included in a first video, and
    the predetermined operation is an operation for pausing the first video.

6. The image display method according to claim 4, wherein
    the low-resolution image is included in a first video,
    the predetermined operation is a frame-by-frame advance operation or a slow-motion replay operation for the first video, and
    in the high-resolution mode, a second video including the high-resolution image and having a frame rate higher than a frame rate of the first video is received, and displayed frame by frame or played at a slow speed.

7. The image display method according to claim 4, wherein
    more viewpoints are selectable in the high-resolution mode than in the normal mode.

8. The image display method according to claim 1, wherein
    the low-resolution image is included in a first video,
    when receiving an operation for pausing the first video, the high-resolution image is displayed and selectable viewpoints increase.

9. An image display method comprising:
    receiving an integrated image in which low-resolution images of a scene from different viewpoints are arranged;
    displaying at least one of the low-resolution images;
    receiving a high-resolution image which shows a partial area of a low-resolution image among the low-resolution images and which has a higher resolution than the low-resolution image; and
    displaying the high-resolution image and the low-resolution image such that the high-resolution image is superposed on the low-resolution image, wherein
    the high-resolution image is an image obtained by enlarging the partial area of the low-resolution image, and the high-resolution image is displayed in an area which does not overlap the partial area of the low-resolution image.

10. The image display method according to claim 9, wherein
    the partial area shows a face or characters.

11. An image distribution method comprising:
    generating an integrated image in which low-resolution images of a scene from different viewpoints are arranged;
    distributing the integrated image to an image display apparatus;
    generating, in response to a request from the image display apparatus, a high-resolution image representing a partial area of a low-resolution image among the low-resolution images, the high-resolution image having a higher resolution than the low-resolution image; and
    distributing, to the image display apparatus, the high-resolution image generated and the low-resolution image generated such that the image display apparatus displays the low-resolution image and the high-resolution image superposed on the low-resolution image, wherein
    the high-resolution image is an image obtained by enlarging the partial area of the low-resolution image, and the high-resolution image is displayed in an area which does not overlap the partial area of the low-resolution image.

12. The image distribution method according to claim 11, comprising:
    transitioning from normal mode in which the low-resolution images are distributed to high-resolution mode in which the high-resolution image is distributed, when the image display apparatus receives a predetermined operation by a user.

13. The image distribution method according to claim 12, wherein
    the low-resolution image is included in a first video, and
    the predetermined operation is an operation for pausing the first video.

14. The image distribution method according to claim 12, wherein
    the low-resolution image is included in a first video,
    the predetermined operation is a frame-by-frame advance operation or a slow-motion replay operation for the first video, and
    in the high-resolution mode, a second video including the high-resolution image and having a frame rate higher than a frame rate of the first video is distributed to the image display apparatus.

15. The image distribution method according to claim 12, wherein
    more viewpoints are selectable by the user in the high-resolution mode than in the normal mode.

16. The image distribution method according to claim 11, wherein the high-resolution image shows a partial area in the low-resolution image.

17. The image distribution method according to claim 16, wherein the partial area shows a face or characters.

18. The image distribution method according to claim 11, comprising:

when distributing the high-resolution image corresponding to the low-resolution image to the image display apparatus, generating an image which is from a viewpoint close to the viewpoint of the low-resolution image among the viewpoints of the low-resolution images and has a higher resolution than the low-resolution images.

19. The image distribution method according to claim 11, further comprising:

selecting the low-resolution image from among the low-resolution images according to an operation by a user.

20. An image display apparatus comprising:

circuitry; and memory, wherein the circuitry, using the memory, performs the image display method according to claim 1.

21. An image distribution apparatus comprising:

circuitry; and memory, wherein the circuitry, using the memory, performs the image distribution method according to claim 11.

\* \* \* \* \*